(12) United States Patent
Alonso

(10) Patent No.: US 11,541,741 B2
(45) Date of Patent: Jan. 3, 2023

(54) MULTI-FUNCTIONAL ELECTROMECHANICAL DEVICE FOR A MILD HYBRID SYSTEM INCLUDING AN INTERNAL COMBUSTION ENGINE, WITH OR WITHOUT USE OF A GEARBOX

(71) Applicant: Two Heads LLC, Washington, DC (US)

(72) Inventor: Jose Luis Alonso, Montevideo (UY)

(73) Assignee: Two Heads LLC, Washington, DC (US)

( * ) Notice: Subject to any disclaimer, the term of this patent is extended or adjusted under 35 U.S.C. 154(b) by 134 days.

(21) Appl. No.: 16/987,494

(22) Filed: Aug. 7, 2020

(65) Prior Publication Data

US 2020/0361302 A1 Nov. 19, 2020

Related U.S. Application Data

(63) Continuation-in-part of application No. PCT/US2019/018801, filed on Feb. 20, 2019, and a continuation-in-part of application No. 16/206,873, filed on Nov. 30, 2018, now abandoned.

(60) Provisional application No. 62/632,444, filed on Feb. 20, 2018.

(51) Int. Cl.
*B60K 6/46* (2007.10)
*B60K 6/365* (2007.10)

(52) U.S. Cl.
CPC ............... *B60K 6/46* (2013.01); *B60K 6/365* (2013.01)

(58) Field of Classification Search
CPC .......... B60K 6/46; B60K 6/365; B60K 6/387; B60K 2006/381; B60K 6/445; B60K 6/48
See application file for complete search history.

(56) References Cited

U.S. PATENT DOCUMENTS

| 2011/0263379 A1* | 10/2011 | Liang | B60W 10/02 477/3 |
|---|---|---|---|
| 2015/0105200 A1* | 4/2015 | Duhaime | B60K 6/383 475/5 |
| 2017/0197613 A1* | 7/2017 | Gv | F16H 3/728 |

FOREIGN PATENT DOCUMENTS

| FR | 2809058 A1 | 11/2011 |
|---|---|---|
| JP | H0914385 A | 1/1997 |

OTHER PUBLICATIONS

Search Opinion in EP Application No. 19781160.7, dated Sep. 29, 2021.

(Continued)

*Primary Examiner* — David J Hlavka
(74) *Attorney, Agent, or Firm* — Fresh IP PLC; Clifford D. Hyra; Aubrey Y. Chen

(57) ABSTRACT

The present invention relates to the field of electromechanical equipment for use in the vehicular field. More specifically, it relates to a selector, doser and transmitter of torque and power between one or more engines and one or more final transmission shafts. Applied for example on a vehicle without a gearbox, the new mechanism allows for selection of the ratio between the speed of rotation of one or more driving sources (such as an internal combustion engine drive shaft) and the final transmission shaft. In a preferred configuration, this selection is controlled electronically, managing the broad scope of possibilities provided by the mechanical configuration of this mechanism to dose the torque and power and regulate the rpm of the driving sources, in a hybrid motorization system.

11 Claims, 16 Drawing Sheets

(56) References Cited

OTHER PUBLICATIONS

Response to Search Opinion in EP Application No. 19781160.7, dated Apr. 29, 2022.

* cited by examiner ately and considers <br>

MULTI-FUNCTIONAL ELECTROMECHANICAL DEVICE FOR A MILD HYBRID SYSTEM INCLUDING AN INTERNAL COMBUSTION ENGINE, WITH OR WITHOUT USE OF A GEARBOX

This application is a continuation-in-part of PCT/US2019/018801 designating the U.S., filed Feb. 20, 2019, which claims the benefit of U.S. Provisional Application No. 62/632,444, filed Feb. 20, 2018, and this application is also a continuation-in-part of U.S. Nonprovisional patent application Ser. No. 16/206,873, which is a continuation-in-part of PCT International Application No. PCT/US2016/066577 designating the U.S., filed Dec. 14, 2016 and claiming priority to U.S. Provisional Application No. 62/343,190, filed May 31, 2016, and each of the above applications is hereby incorporated by reference herein in its entirety.

FIELD OF THE DISCLOSURE

The present invention relates to the field of electromechanical equipment for use in the vehicular field. More specifically, it relates to a selector, doser and transmitter of torque and power between one or more engines and one or more final transmission shafts. Applied for example on a vehicle without a gearbox, the new mechanism allows for selection of the ratio between the speed of rotation of one or more driving sources (such as an internal combustion engine drive shaft) and the final transmission shaft. In a preferred configuration, this selection is controlled electronically, managing the broad scope of possibilities provided by the mechanical configuration of this mechanism to dose the torque and power and regulate the rpm of the driving sources, in a hybrid motorization system. This mechanism reduces and minimizes the usual frictional energy losses of traditional gearboxes. In a mild hybrid vehicle, the new mechanism makes it possible to mechanically link the sources of motive energy with those of power generation, so that an electronic command unit (known in the art) may use the new mechanism to manage the use of said resources in the most convenient way. The mechanism operates as an energy distributor through which can simultaneously flow: the applied motive power towards the final transmission shaft and the energy to be recovered to one or more sources of generation. The electronic command unit may, in this environment, sense the operating conditions of the vehicle and, depending on this, dispense available resources, driving the energy to be recovered for electric generation and/or delivering power to the final transmission shaft, as required. The combined operation of the available driving sources and their respective operating abilities, allows for maximization of the use of the events of power generation and for dosing the performance of the driving sources in operating ranges of greater efficiency for each one. Unlike other mild hybrid configurations, known in the prior art, which only enable the administration of torque available from the hybrid set (e.g. internal combustion engine (ICE) and electric machine), the new mechanism allows torque and RPM to be managed, locating the performance of the hybrid set at the best operating range. The ability of the new mechanism to manage torque, power and rpm throughout the operative range of the vehicle is a reason to do without the use of a gearbox. It is an advantage because it reduces weight, space and costs in the powertrain. In addition, the smaller number of moving mechanical parts involved, in comparison with the previous art, results in a reduction of the energy losses due to friction. The mechanism refers to the field of linking systems between power sources and final transmission shaft, adopting variable configurations, is applicable in hybrid or non-hybrid systems, suitable to work with any type of motor, and applicable to any type of transmission shaft, being able to dispense with a gearbox, working as a non-stepped progressive link that allows reduction of friction losses. The new mechanism preferably comprises one or more satellite mechanisms, which can be connected to one or more motors, be they internal combustion and/or electric, or any other type of motor power source that generates or transforms energy of any kind, directly linked to one or more final transmission shafts through said satellite mechanism or through any other suitable binding means, for example as described in greater detail below. The invention is especially suitable for application to mild hybrid systems (voltages less than 60 volts and best known and used 48 volts), or other applications, even in those where electric motors are dispensed with. The dimensions, shapes, location and any other reference of the indicated parts, as well as of the incorporated elements, and the indicated ways of connection, refer to an alternative preferred configuration and do not exclude other possible variants.

BACKGROUND

Mild Hybrid Systems (MHS) are known in the art. For example, various systems with rotor motor-generator arrangements are known in the art, but none of those systems manages to optimize operation of the internal combustion engine, the motor/generator rotor, and the transmission.

For example, the MHS announced by VALEO comprises a motor/generator that uses a single rotor, installed in between the internal combustion engine and the transmission. The single rotor rotates at the same speed as the internal combustion engine.

In addition, an MHS announced by DELPHI comprises a motor/generator that uses a single rotor, which is installed next to the internal combustion engine's front power take off (PTO), and which is coupled to it by a belt.

The company AVL has disclosed two alternative MHS arrangements. One comprises a motor/generator that uses a single rotor, installed next to the internal combustion engine's front power take-off and connected via a belt-drive or directly to the crankshaft. The other disclosed arrangement comprises an internal combustion engine and an electric motor that are not connected mechanically.

The current state of the art focuses on, and considers optimal, the use of a single rotor motor/generator, which is designed to have the optimal size to perform specific tasks. Current, known 48-volt mild hybrid systems, such as those developed by Valeo, Continental, and Delphy, among others, all require conventional transmissions coupled to an internal combustion engine (ICE) and an electrical machine (EM). Planetary mechanisms do not apply.

The system in Toyota Prius hybrid vehicles, as well as other hybrid vehicles, apply a satellite mechanism, but work exclusively with high voltages and with a specific connection of an ICE to the Carrier; from an electric motor-generator to the SUN and from an electric motor to the Ring.

These systems do not require a conventional transmission, but the rpm variance is produced exclusively and directly by the electric motor connected to the Ring and consecutively arranged 2 or more reducers before reaching the required rpm for the final transmission shaft.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description. Rather, the scope of the invention is defined by the appended claims.

In certain embodiments, the disclosed embodiments may include one or more of the features described herein.

The present invention provides a multi-functional electromechanical device designed to physically and electrically connect, either directly or indirectly, to an internal combustion engine (also referred to herein at times simply as an "engine"). The multi-functional electromechanical device includes at least two assemblies, which work simultaneously and, in embodiments, independently, to provide three functions. The first assembly, which is referred to herein as a motor/generator set, is a set of at least one electric motor/generators that, under some circumstances (motor mode), use electrical power stored in an accumulator set (e.g., a battery or a set of batteries) to start the internal combustion engine, provide mechanical assistance to the engine, and/or run some or all of its parasitic devices.

Under other circumstances, the motor/generator set uses some of the rotational energy of a running internal combustion engine or the rotational energy of its associated transmission to generate electricity (generator mode), which is used to run some or all parasitic devices of the engine and, preferably at times, the vehicle in which it is employed in general, as well as some or all parasitic devices of the engine and the vehicle together. Alternatively or additionally, when in generator mode, some or all of the electricity that is generated by the motor/generator set can be stored in an accumulator set for later use, when needed. The second assembly of the multi-functional electromechanical device, which is referred to herein as an energy distributor, can provide a separate and distinct function from the motor/generator set. Under certain circumstances, it can enable use of electricity stored in an accumulator set to assist the internal combustion engine in providing power for movement of the vehicle to which it and the internal combustion engine are attached. The energy distributor assembly can transfer electromechanical power received from the motor/generator set directly to the internal combustion engine or directly to the transmission or both. The energy distributor assembly has the ability to decouple the power train movement of the internal combustion engine and the transmission using a clutch, torque converter, or equivalent device. In this way, the energy distributor assembly can direct mechanical power directly to the transmission without the need to engage the internal combustion engine. One general function of the energy distributor assembly is to control whether rotational energy delivered by the motor/generator set (i.e., electromechanical power) is delivered to the internal combustion engine to supplement its power output or to deliver the energy directly to the transmission.

Another general function of the energy distributor assembly is to control delivery of rotational energy of the engine and/or transmission to the motor/generator set to provide electrical energy to parasitic devices and/or accumulator sets. Typically, the electrical energy is routed to the parasitic devices through an accumulator set. The multi-functional electromechanical device of the invention can be physically and electrically connected to an internal combustion engine, and, preferably also to a transmission. In such embodiments, the invention provides an MHS that comprises an internal combustion engine, the multi-functional electromechanical device, and a transmission.

The present invention provides an electromechanical system that, in embodiments, uses at least one Electronic Control Unit (ECU) to control the direction of rotation of one or more rotors (armatures) in a motor/generator set. When two or more motor/generators are present, the ECU can split specific tasks between them. The multi-functional electromechanical device also includes a mechanical system, referred to herein as an energy distributor, which together with the motor/generator set and the ECU are capable of managing, combining, and distributing, in the most efficient way (as commanded by the (ECU)), the capabilities of the two assemblies using computer coding that is well known in the art and widely used. It is to be noted that current MHS do not include an energy distributor. As such, in embodiments, the present invention provides an advantage over MHS currently known in the art and provides an advancement in the art that can be applied in the future for all types of engines.

In general, there are three different sources of movement that are primarily relevant to the multi-functional electromechanical device of the invention: (i) the rotational output of an internal combustion engine; (ii) the rotational direction of the rotors of the motor/generator set, and (iii) the rotational movement of a transmission. The multi-functional electromechanical device of the invention efficiently couples and integrates these three sources of movement to allow for improved fuel efficiency and improved power production, as compared to MHS currently known in the art.

The present invention improves the managing of available resources and improves the managing of each component, as compared to electromechanical devices for use in MHS known in the art. It is well known that in recent years electronics have made an exponential leap in sophistication, and further that in the field of the invention these advancements have allowed the production of a great number of sensors capable of measuring an enormous number of different events taking place in a vehicle, or even just a drivetrain, at any one moment. However, these advancements in sophistication are not always well implemented by the mechanical arrangements of the drivetrain or the vehicle in which it is placed.

In embodiments, by splitting the motor/generator set into two or more motors/generators and their intrinsic rotors of the same type but of smaller size than currently used in the art, the multi-functional electromechanical device is able to perform as a motor and generator at the same time. That is, under the control of the ECU, each rotor of the motor/generator set can have a rotational direction function, albeit at different times, such that the motor/generator to which it belongs can act as either a motor or a generator. In such a way, the ECU can, for example, dedicate one motor/generator to run constantly as a motor providing mechanical or electromechanical power to parasitic elements of the vehicle or the accumulator set, e.g., by way of a pulley/belt system, while the other motor/generators may perform as generators or motors, depending on the need detected by the ECU when sensing the circumstances under which the vehicle is operating. For example, in a configuration of the multi-functional electromechanical device in which there are three motor/generator sets in the motor/generator assembly, the ECU can, when the engine is under load, dedicate one motor/generator to act as a motor to supply power to the engine while turning off the other two.

If an additional load on the engine is detected, the ECU can dedicate a second motor/generator to act as a motor to supply power to the engine while leaving the third motor off.

Under extreme loads, the ECU can dedicate all three motor/generators to act as motors to supply power to the engine.

The electromechanical device may be used, for example on a vehicle without a gearbox, with a new mechanism, which comprises a selector, doser and transmitter of torque and power between one or more power sources and one or more final transmission shafts, that allows for selection of the ratio between the speed of rotation of one or more driving sources (such as an internal combustion engine drive shaft) and the final transmission shaft. In a preferred configuration, this selection is controlled electronically, managing the broad scope of possibilities provided by the mechanical configuration of this mechanism to dose the torque and power and regulate the rpm of the driving sources, in a hybrid motorization system. This mechanism reduces and minimizes the usual frictional energy losses of traditional gearboxes.

In a mild hybrid vehicle, the new mechanism makes it possible to mechanically link the sources of motive energy with those of power generation, so that an electronic command unit (known in the art) may use the new mechanism to manage the use of said resources in the most convenient way.

The mechanism operates as an energy distributor through which can simultaneously flow: the applied motive power towards the final transmission shaft and the energy to be recovered to one or more sources of generation. The electronic command unit may, in this environment, sense the operating conditions of the vehicle and, depending on this, dispense available resources, driving the energy to be recovered for electric generation and/or delivering power to the final transmission shaft, as required.

The combined operation of the available driving sources and their respective operating abilities, allows for maximization of the use of the events of power generation and for dosing the performance of the driving sources in operating ranges of greater efficiency for each one.

Unlike other mild hybrid configurations, known in the prior art, which only enable the administration of TORQUE available from the hybrid set (e.g. internal combustion engine (ICE) and electric machine), the new mechanism allows TORQUE and RPM to be managed, locating the performance of the hybrid set at the best operating range. The ability of the new mechanism to manage torque, power and rpm throughout the operative range of the vehicle is a reason to do without the use of a gearbox. It is an advantage because it reduces weight, space and costs in the powertrain. In addition, the smaller number of moving mechanical parts involved, in comparison with the previous art, results in a reduction of the energy losses due to friction.

The mechanism refers to the field of linking systems between motor and final transmission shaft, adopting variable configurations, is applicable in hybrid or non-hybrid systems, suitable to work with any type of motor, and applicable to any type of transmission shaft, being able to dispense with a gearbox, working as a non-stepped progressive link that allows reduction of friction losses.

The new mechanism preferably comprises one or more satellite mechanisms, which can be connected to one or more motors, be they internal combustion and/or electric, or any other type of motor power source that generates or transforms energy of any kind, directly linked to one or more final transmission shafts through said satellite mechanism or through any other suitable binding means, for example as described in greater detail below.

The invention is especially suitable for application to mild hybrid systems (voltages less than 60 volts and best known and used 48 volts), or other applications, even in those where electric motors are dispensed with.

Thus, in an embodiment of the present invention, a drive mechanism in a hybrid or mild hybrid motorization system capable of delivering and recovering energy includes one or more planetary gear systems, each of the one or more planetary gear systems including a sun gear, a ring gear, and a carrier including traveling gears. The sun gear, and/or the ring gear, and/or the carrier of each planetary gear system is connected to one or more energy sources. At least one of the one or more energy sources is connected to the sun gear, and/or the ring gear, and/or the carrier of a planetary gear system through gearing, and/or a clutch, and/or a brake. One or more of the energy sources is configured to act as a regulator of output revolutions of one or more of the one or more planetary gear systems, such that the one or more planetary gear systems regulated by the one or more of the energy sources are configured to have a selectably variable ratio of input power and revolutions per minute to output power and revolutions per minute, making it possible to dose power and regulate revolutions in connection to a final transmission shaft.

In a drive mechanism according to such an embodiment, a) each of the energy sources may have the same characteristics, b) each of the energy sources may have different characteristics, or c) some of the energy sources may have the same characteristics and some of the energy sources may have different characteristics. Additionally, one or more of the one or more planetary gear systems may have one or more additional sun gears, ring gears and/or carriers. Further, the selectably variable ratio of input rpm and power to output rpm and power of the regulated planetary gear systems allows the output revolutions per minute to scale progressively from a stop to any higher rotational speed the drive mechanism can achieve, without the need for a gearbox.

A drive mechanism according to this aforementioned embodiment may also include a control unit configured to control a clutch and/or brake connecting the at least one of the one or more energy sources to the sun gear, the ring gear, and/or the carrier of the planetary gear system, in order to select the ratio of input power and revolutions per minute to output power and revolutions per minute. The control unit may be further configured to control the rotational velocity of the one or more energy sources and of the one or more planetary gear systems, in order to achieve a desired rotational velocity at the final shaft of the transmission. The control unit may also be configured to select the rotational velocities of the one or more energy sources and of the one or more planetary gear systems from a plurality of options in order to maximize efficiency, or based on other factors.

Additionally, the one or more energy sources may include one or more motors connected through at least one of the planetary gear systems to the final transmission shaft through a final control system, without a transmission. Further, the one or more energy sources may include one or more electric motors configured to alternatively function as a generator and as a motor. The planetary gear systems may bind some or all of the energy sources to the final transmission shaft via a final reduction gear or other final control system. The energy sources may also include one or more electric machines configured to recover energy during deceleration and braking of a vehicle that includes the hybrid or mild hybrid motorization system installed thereon. The energy sources may further include one or more electric machines configured to generate energy from rotational movement of another component of the drive mechanism, when a vehicle on which the hybrid or mild-hybrid motorization system is installed is stopped or does not require energy to continue its displacement. The energy sources may additionally include an internal combustion engine and one or more electric machines, the internal combustion engine may be connected to the sun gear of a first of the planetary gear systems and the one or more electric machines may be connected through gearing and/or one or more clutches and/or one or more brakes to the ring gear of the first planetary gear system, and the carrier of the first planetary gear system may be connected to the differential of a vehicle. The first planetary gear system may be configured to provide a pre-determined relationship between rotational velocity of the carrier of the first planetary gear system and rotational velocity of the ring gear and sun gear of the first planetary gear system. Such a drive mechanism may also include a control unit configured to control a clutch and/or brake connecting the electric machines to the ring gear of the first planetary gear system, in order to select the ratio of input power and revolutions per minute at the sun gear to output power and revolutions per minute at the carrier, while obtaining a selected output revolutions per minute at the carrier.

A method of using a drive mechanism according to an embodiment of the invention may involve controlling the clutch and/or brake connecting the at least one of the one or more energy sources to the sun gear, the ring gear, and/or the carrier of the planetary gear system, and thereby selecting the ratio of input power and revolutions per minute to output power and revolutions per minute, controlling the rotational velocity of the one or more energy sources and of the one or more planetary gear systems, and thereby achieving a desired rotational velocity at the final shaft of the transmission, and selecting the rotational velocities of the one or more energy sources and of the one or more planetary gear systems from a plurality of options in order to maximize efficiency, or based on other considerations.

In another embodiment of the invention, a drive mechanism in a non-hybrid motorization system includes one or more planetary gear systems connected to one or more sources of energy, where a first of the planetary gear systems is configured to be connected to a specific one of the sources of energy when the specific source of energy is operating at a first rotational speed, and at least a second one of the planetary gear systems is configured to be connected to the specific source of energy when the specific source of energy is operating at a second rotational speed different than the first rotational speed. A sun gear, and/or carrier, and/or ring gear of the first planetary gear system is linked with a sun gear, and/or carrier, and/or ring gear of the at least one second planetary gear system, so that the first planetary gear system is configured to have a selectably variable ratio of input power and rotational velocity to output power and rotational velocity, and to be directly connected to a final transmission shaft.

In a drive mechanism according to such an embodiment, the first planetary gear system may be linked with the at least one second planetary gear system through gearing, and/or a clutch, and/or a brake. A drive mechanism according to this embodiment may also include a control unit configured to control the clutch and/or brake through which the first planetary gear system is linked with the at least one second planetary gear system, and/or to control the rotational speed of the sources of energy, to select the ratio of input power and rotational velocity to output power and rotational velocity of the first planetary gear system and achieve a desired rotational velocity of the final transmission shaft. A method of using the drive mechanism according to this embodiment may involve connecting the first of the one or more planetary gear systems to the specific one of the energy sources when the specific one of the energy sources is operating at the first rotational speed, connecting the second of the planetary gear systems to the specific energy source when the specific one of the energy sources is operating at the second rotational speed that is different than the first rotational speed, linking the first of the one or more planetary gear systems with the at least one second planetary gear system, and delivering a selectively variable ratio of input power and rotational velocity to output power and rotational velocity for the first of the one or more planetary gear systems, where the first of the one or more planetary gear systems is directly connected to the final transmission shaft.

The dimensions, shapes, location and any other reference of the indicated parts, as well as of the incorporated elements, and the indicated ways of connection, refer to an alternative preferred configuration and do not exclude other possible variants. These and further and other objects and features of the invention are apparent in the disclosure, which includes the above and ongoing written specification, with the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The drawings are not to be considered as limiting the scope of the invention in any way. The invention will be more particularly described in conjunction with the following drawings wherein.

DETAILED DESCRIPTION OF VARIOUS EMBODIMENTS

Figure 1:
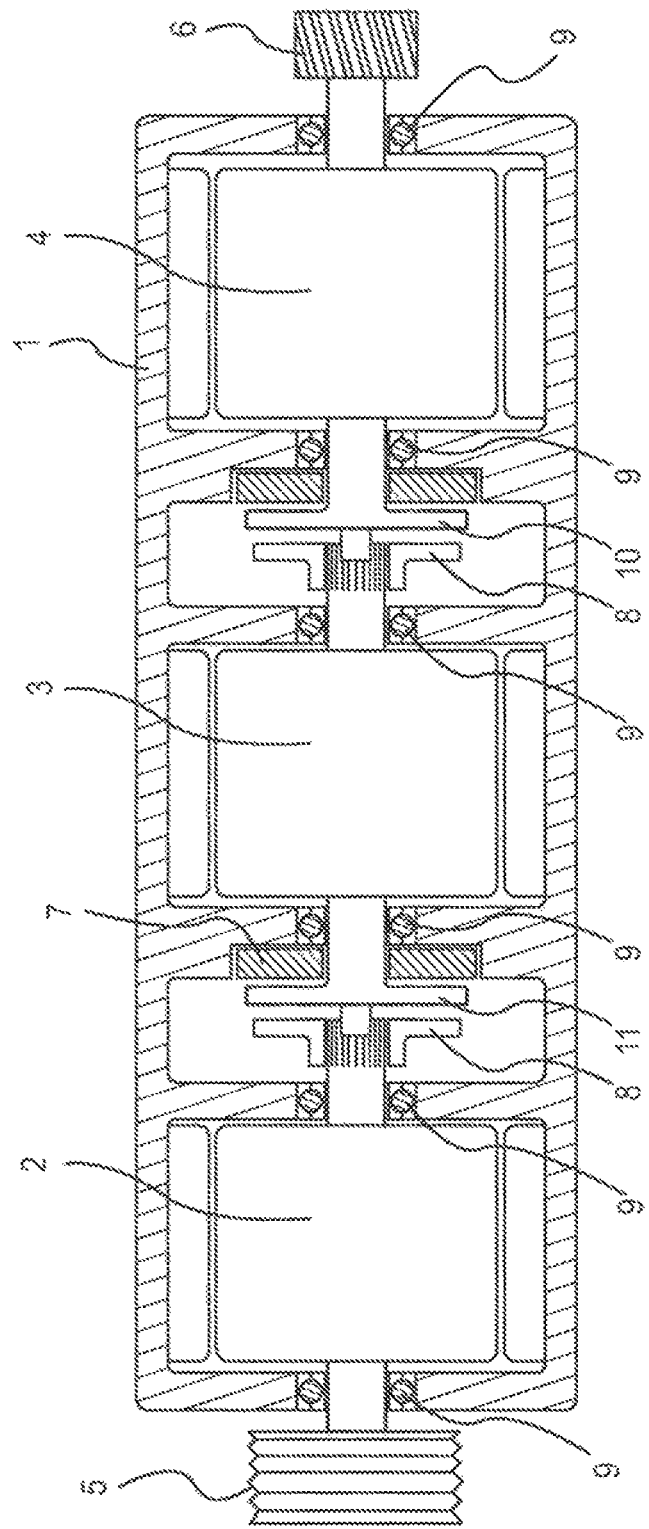
FIG. 1 is a cut-away view of a motor/generator assembly comprising one motor/generator set of a multi-functional electromechanical device according to an embodiment of the invention. In this embodiment, the motor/generator assembly comprises a rotor (element 2) of one motor/generator for supplying power to the engine and/or its parasitic devices, and two other rotors (elements 3 and 4) of two other motor/generators, which can supply power to the engine (i.e., act as motors) or can generate electrical energy for storage or use to run parasitic devices (i.e., act as generators). It is to be noted that pulley 5 is an optional element, and is depicted in the figure solely to better describe this embodiment of the invention.

A multi-functional electromechanical device for a mild hybrid system including an internal combustion engine, with or without use of a gearbox, will now be disclosed in terms of various exemplary embodiments. This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted.

The description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, "at least one of A, B, and C" indicates A or B or C or any combination thereof.

As used herein, the singular form of a word includes the plural, and vice versa, unless the context clearly dictates otherwise. Thus, the references "a", "an", and "the" are generally inclusive of the plurals of the respective terms. Thus, for example, reference to a motor/generator set includes a plurality of such sets (and similarly, reference to motor/generator sets includes a single motor/generator), and reference to "the energy distributor" includes reference to one or more energy distributors and equivalents thereof known to those skilled in the art, and so forth. Furthermore, the use of terms that can be described using equivalent terms includes the use of those equivalent terms. For example, the term "rotor" includes the term "armature" and other equivalent terms used in the automotive and electrical industries. In addition, as the parts of the device can be made from any of the common and well-known materials used in building internal combustion engines and accessories to such engines, it is not necessary in this document to give a listing of materials and methods that can be used in forming each element and fastening certain elements to other elements or making electrical connections.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, ranges are used herein in shorthand, so as to avoid having to list and describe each and every value within the range. Any appropriate value within the range can be selected, where appropriate, as the upper value, lower value, or the terminus of the range.

The words "comprise", "comprises", and "comprising" are to be interpreted inclusively rather than exclusively. Likewise the terms "include", "including" and "or" should all be construed to be inclusive, unless such a construction is clearly prohibited from the context. The terms "comprising" or "including" are intended to include embodiments encompassed by the terms "consisting essentially of" and "consisting of". Similarly, the term "consisting essentially of" is intended to include embodiments encompassed by the term "consisting of". Although having distinct meanings, the terms "comprising", "having", "containing" and "consisting of" may be replaced with one another throughout the description of the invention.

"About" means a referenced numeric indication plus or minus 10% of that referenced numeric indication. For example, the term about 4 would include a range of 3.6 to 4.4. All numbers expressing quantities of ingredients, reaction conditions, and so forth used in the specification are to be understood as being modified in all instances by the term "about." Accordingly, unless indicated to the contrary, the numerical parameters set forth herein are approximations that can vary depending upon the desired properties sought to be obtained. At the very least, and not as an attempt to limit the application of the doctrine of equivalents to the scope of any claims, each numerical parameter should be construed in light of the number of significant digits and ordinary rounding approaches.

Wherever the phrase "for example," "such as," "including" and the like are used herein, the phrase "and without limitation" is understood to follow unless explicitly stated otherwise.

"Typically" or "optionally" means that the subsequently described event or circumstance may or may not occur, and that the description includes instances where said event or circumstance occurs and instances where it does not.

The present invention relates to a multi-functional electromechanical device, which is suitable for use, among other things, in a Mild Hybrid System (MHS) for assistance to an internal combustion engine. Although the detailed description herein focuses on embodiments relating to implementation of the device in vehicles, it is to be understood that the invention is equally applicable to use in stationary environments (e.g., for use in running industrial equipment, such as lathes, drills, conveyor belts, welders, etc.). The device is a multi-assembly device capable of starting an internal combustion engine and delivering both electrical and mechanical power for operation of the engine and/or some or all parasitic equipment required by the engine or a vehicle in which it is placed, such as, for example: water pump, power steering pump, air conditioning compressor, vacuum pump, passenger compartment fans, and the elements that enable the engine to work, such as, for example: the starter, the oil pump, the fuel pump, and the volumetric compressor. Other optional exemplary parasitic equipment in addition to those listed herein will be immediately apparent to the skilled artisan, and thus, for brevity, are not listed herein. The device is also capable of generating electricity for storage in an accumulator set. In general, the manufacturer of the vehicle will program the device to perform in desired ways using an Electronic Control Unit (ECU) and supporting sensors to provide the vehicle with the power and fuel efficiency characteristics desired for the vehicle.

In its basic form, the present invention provides an accessory system to an internal combustion engine that provides a power assistance system, which can, in embodiments, assist in starting the engine, running some or all of the parasitic equipment of the engine, running some or all parasitic equipment of the vehicle in which it is employed, generating electrical energy for storage and later use, or various combinations of these functions. The accessory is referred to herein as a multi-functional electromechanical device, and in exemplary embodiments, it comprises two main assemblies. The first assembly is referred to herein as a motor/generator set, which is essentially an electromechanical assembly comprising one, two, three, or more motor/generators and which includes their intrinsic rotors and, in embodiments, stators. The second assembly is referred to herein as an energy distributor, which includes mechanical elements for delivery of mechanical energy (e.g., rotational energy) to and from the motor generator set and the engine and/or transmission. The two assemblies can physically operate independently based on inputs from one or more ECU. In general, the motor/generator set can perform, in embodiments, three main tasks: (i) starting an engine, (ii) providing power to assist the engine by providing mechanical power to the engine and/or to provide mechanical or electrical power to assist in running, or to fully run, parasitic devices, and (iii) providing mechanical power directly to a transmission to move a vehicle a relatively short distance or as far as the energy in the accumulator sets permits. In general, the energy distributor executes instructions from the ECU to couple the outputs of the engine, the motor/generator set, the transmission, power take offs, and other functions of a powertrain that affect torque, power, fuel efficiency, etc. Standard, well-known electrical connections can be used to connect the ECU to the motor/generator set and standard computer connections and software coding well-known in the industry can be used to make the appropriate software-to-software and software-to-hardware connections.

The multi-functional electromechanical device includes an assembly, which includes at least one motor/generator set that is independent of the engine and that has the particularity and capability to perform two functions simultaneously: (i) convert electrical power into a rotary motion to assist the engine, and (ii) generate electrical power to run parasitic equipment and/or for storage for later use. In embodiments, the assembly receives and delivers rotary motion through a power take off, which can be coupled to the engine and/or transmission of a vehicle, and/or any mechanism that ultimately delivers and/or distributes power to propel a vehicle in the direction desired (e.g., forward or backward).

With reference to the embodiment depicted in FIG. 1, the motor/generator set comprises outer body 1 that houses one or more motor/generators containing rotors (2,3,4). Preferably, outer body 1 is a one-piece element, such as one formed by die casting of a desired metal or other material known in the art as useful for making assembly outer bodies or housings, such as, but not limited to, ceramics and plastics. As depicted in the figure, a preferred embodiment can comprise three motor/generators per motor/generator set. One motor/generator, e.g., a motor comprising rotor element 2 in FIG. 1, may always acts as electric motor that supports or is dedicated to running some or all necessary accessories for the engine to start and run. The others, e.g., motor/generators comprising rotor elements 3,4 in FIG. 1, selectively operate as electric motors or as generators, as dictated by the ECU. The motor/generator set of this exemplary embodiment further comprises pulley 5 to mechanically/physically couple the motor/generator set to parasitic electrical devices and for connection with the engine. In other embodiments, pulley 5 is omitted. Inclusion of pulley 5 can be dictated by the manufacturer depending on the configuration of the engine compartment and other vehicle-specific considerations. Yet further, it can be seen that the motor/generator set of the depicted embodiment comprises solenoids 7, movable couplings 8, bearings 9, shaft 10 of rotor 4, shaft 11 of rotor 3, and shaft 12 of rotor 2. The figure further shows that there is a mechanical connection between shaft 10 of rotor 4 to connector 6, which allows the rotational movement of connector 6 to be transferred to the engine or transmission by way of the energy distributor (not depicted).

The connection between the motor/generator set and the energy distributor may be made using any number of systems known in the art, and it is to be understood that depiction in the figure of use of mechanical gears is for simplicity only.

Each one of the coupling and uncoupling mechanisms between each rotor has full autonomy regarding the mechanisms of coupling and uncoupling of the other rotors within the motor/generator set. Further, it is possible to implement any attachment and detachment system between the rotors.

In a preferred embodiment, the coupling mechanism of each rotor is preferably a solenoid that, when activated, attracts to itself a movable disc (PLATEN/PLATINA), which then couples two rotors to each other, or the unit to which the solenoid is activated will jointly activate the drive shaft or the drive shafts, as appropriate.

In another preferred embodiment of coupling of each rotor with the drive shaft or drive shafts, as appropriate, is by using independent axes for each rotor partially embedded or recessed in the axes of the other rotors, being all aligned.

The operation of the multi-functional electromechanical device in a vehicle, which will be associated with any type or design of an internal combustion engine, can function, with adjustment and selective administration of operation of each motor/generator set, as either a motor or a generator as needed, administered through one or more ECU. The ECU, which independently of other tasks that it could manage for various purposes, will essentially control the storage charge of the available accumulator set, as required by the vehicle, determining at what interval it needs to recover energy storage, and when is necessary and/or desirable to assist the engine to move the vehicle via the transmission.

Figure 2:
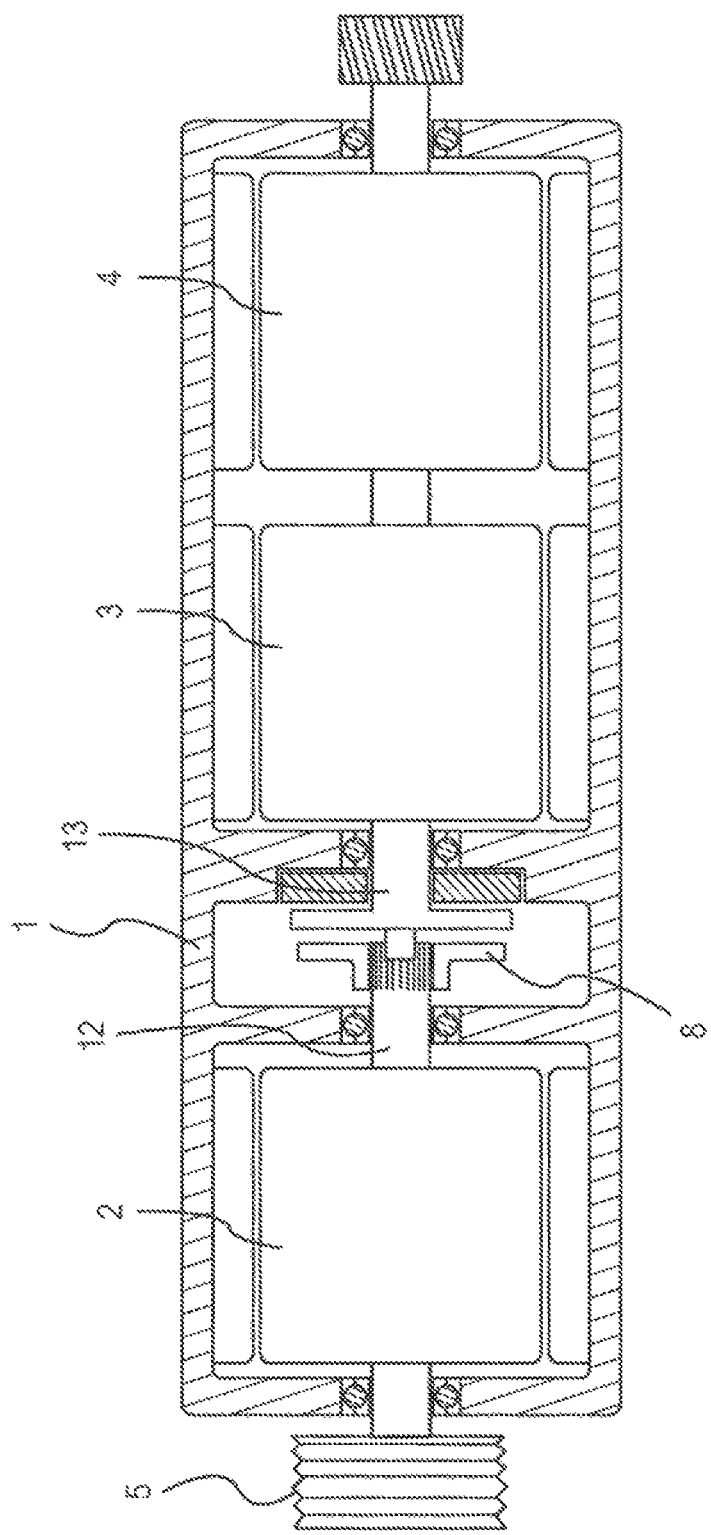
FIG. 2 is a cut-away view of the motor/generator assembly depicted in FIG. 1, in which two rotors (elements 3 and 4) are physically linked such that they work as a single unit instead of independently, as is the situation in FIG. 1.

Turning to FIG. 2, it is shown that in some embodiments of the invention multiple rotors, e.g., elements 3,4, are mechanically linked or coupled by way of a single shaft 13, and thus serve the same function, while rotor 2 is still free to act independently of rotors 3,4. It is important to understand that, except in embodiments such as that depicted in FIG. 2, in which two rotors are mechanically coupled, the use of movable coupling and decoupling mechanisms 8 permits the rotors of the motor/generator set to either couple or uncouple, alternatively and independently as required for each motor/generator to act as either a motor or a generator. As such, in FIG. 2, shaft 12 is free to act independently of rotors 3,4. Power take off outputs (not depicted) on both sides of the assembly, or for that matter on both sides of the MHS encompassed by the invention, are preferably on the same axis. Note that rotors 3,4 share in this configuration the same main shaft 13 connected to connection 6 then to the engine and/or power distribution mechanism and/or transmission.

Having multiple motor/generators allows the most comprehensive system ductility. The operational combination thereof offers the possibility of providing the response that combines greater energy efficiency for each of the different situations that arise in actual use of a vehicle equipped with an MHS. For example, a preferred configuration could apply a set of three motors in one motor/generator set. The first works as motor to keep the parasitic elements needed to support running of the engine. Some different combinations of applicable diagrams, where E=motor, G=generator, and 0=disconnected or offline the power circuit, as well as engine or generator, could be: [EGG], [EEE], [E0E], [EG0], [EGE], [E00], and [E0G].

As an example, in the event that some parasitic element requires support in addition to the support provided by the first motor/generator of the motor/generator set, which is acting as a motor, the second motor/generator would be dedicated as a motor to assist in this task. In embodiments where a pulley is present, the motors can support the parasitic devices either through the pulley or through the pulley and through mechanical assistance to the engine. In embodiments where a pulley is not included, the motors can support running of parasitic elements through mechanical assistance to the engine. In this event, the configuration for delivering additional energy could be [EE0]. Likewise, in the situation where two motor/generators attend to the power consumption needs of parasitic elements, and the third one is free to act as a generator, the configuration can be represented by [EE-G]. Yet as another example, in the situation where the first two motor/generators are attending to the power consumption needs of parasitic elements and the third motor/generator is assigned to assist, in addition to the engine, the transmission, the configuration can be represented by [EE-E].

Another situation, [000], is where the set operates simply as direct axis of the power take off, where the parasitic elements necessary for operation of the engine are directly powered from the engine itself. In this situation, the motors simply behave as momentum wheels.

The large number of applicable combinations allows the ECU to have a menu of options that it can weigh among variables, such as, but not exclusive to, power requirements, power energy available in storage, power energy required for consumption, and emissions, and allows it to choose the best variation in individual motor/generator functions to combine to provide for each specific need.

Figure 3:
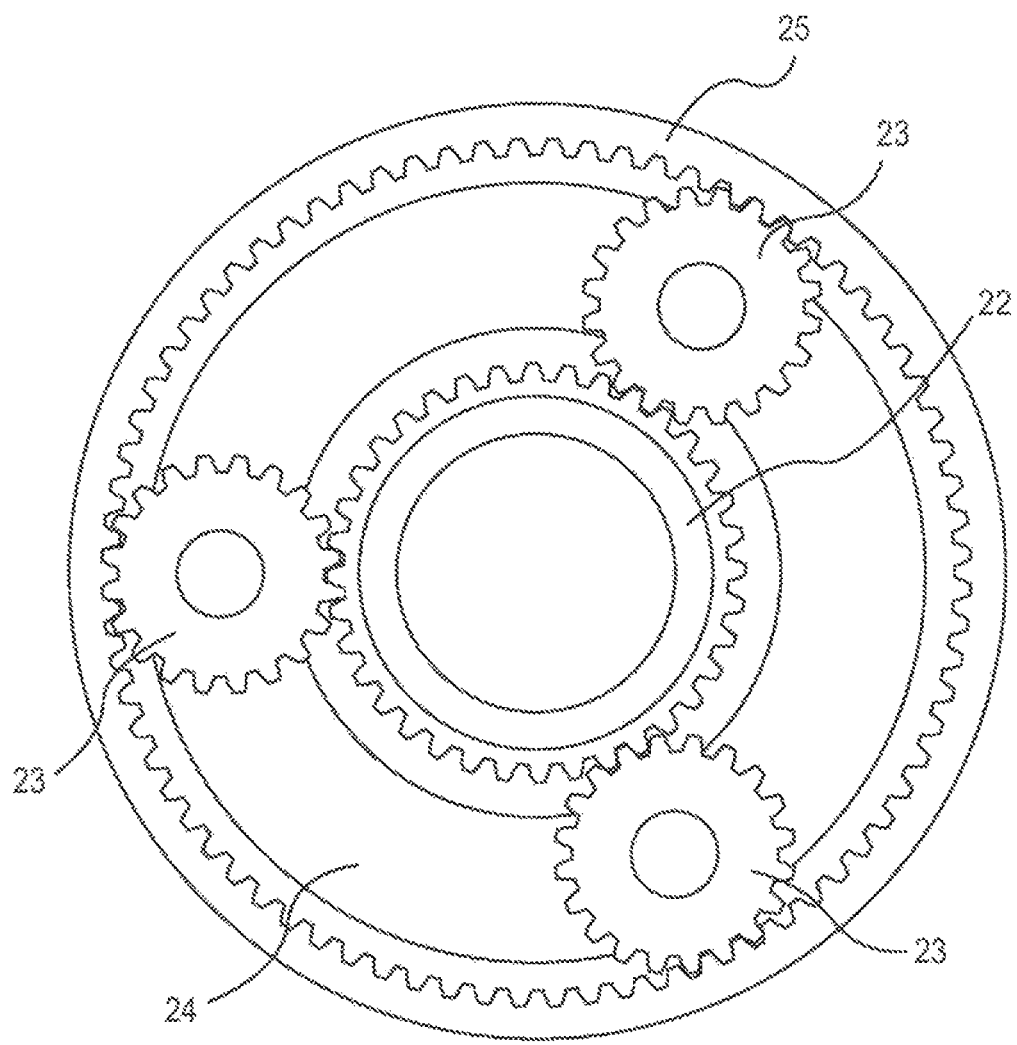
FIG. 3 is a schematic depiction of an energy distributor of a multi-functional electromechanical device according to an embodiment of the invention. In this embodiment, the energy distributor comprises a planetary gear system for power distribution from an internal combustion engine to a transmission and/or to one or more motor/generator sets, from the motor/generator sets to the transmission, and from the transmission to the motor/generator sets.

FIG. 3 shows an embodiment of a planetary gearing mechanism for an energy distributor. This embodiment of the invention favors the link between the engine, motor/generator set, and transmission. The figure depicts shaft 22 driven by the engine, planetary carrier 24, which is connected to a motor/generator set (not depicted), satellite gears 23, linking shaft 22, and outer crown 25, which is connected to the vehicle's transmission (not depicted).

Figure 4:
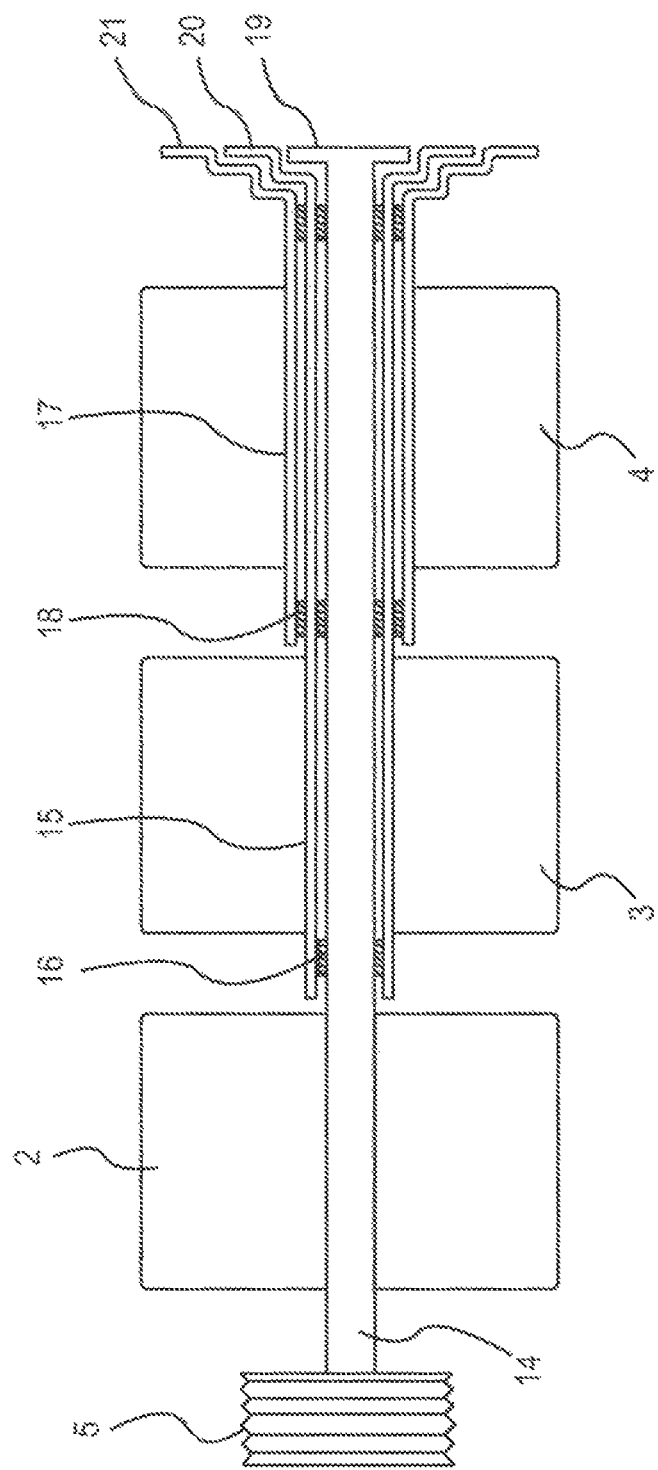
FIG. 4 schematically depicts an alternative solution to the embodiment depicted in FIG. 1, in which there is a different coupling of the shafts.

With reference to FIG. 4, in a preferred embodiment, a shaft 14, which includes pulley anchor point 19, comprises a central core-axis that supports rotor 2, and two exterior sheaths-axes 15,17, each functioning as a drive shaft for rotors 3 and 4, respectively. In a preferred embodiment, between the central axis and the exterior sheaths-axes, there are shielding bearings 16,18 that prevent or minimize friction caused by different rotation among them. As shown in FIG. 4, elements 20 and 21 are the coupling/decoupling mechanisms for rotors 3 and 4, respectively.

Figure 5:
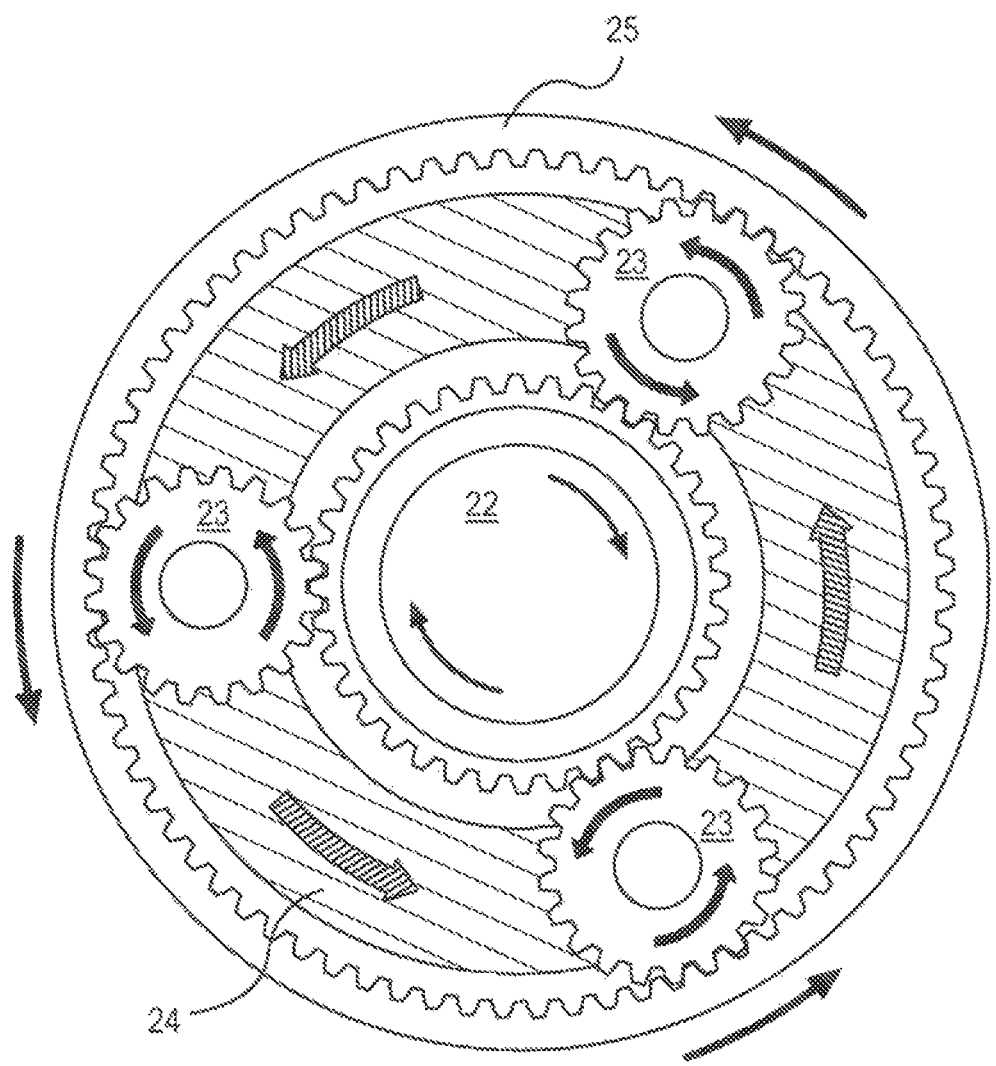
FIG. 5 is a schematic depiction of a planetary gear system of an energy distributor according to embodiments of the invention in the situation where the multi-functional electromechanical device is providing power assistance to an internal combustion engine.

FIG. 5 depicts schematically movement of gears within a planetary gear system of the energy distributor of embodiments of the multi-functional electromechanical device during the situation of acceleration. It shows central shaft 22 rotating clockwise powered by the engine running and satellite gears 23 rotating counterclockwise as a result. Rotation of satellite gears 23 causes the outer crown 25 to rotate counterclockwise, thus causing rotation in the transmission. Planetary carrier 24 rotates counterclockwise, increasing the power or torque applied to move the vehicle.

As a non-limiting summary of the energy distributor operation depicted in FIG. 5, the internal combustion engine is started and, while the vehicle is stopped, outer crown 25 is stopped. The rotation of the central shaft driven by the internal combustion engine makes satellite gears 23 rotate and these make the ring attached to the power take-off of the assembled motor/generator set rotate, generating power to restore the power consumed during starting of the internal combustion engine. When the vehicle is in motion, outer crown 25 engaged to the transmission is released and rotation of the central shaft caused by the rotation of the crankshaft of the internal combustion engine transfers rotation through satellite gears 23 to outer crown 25, which will move the transmission and the vehicle. If the acceleration requested by the user requires more power than delivered by the internal combustion engine, the ECU will instruct at least one of the motor-generator sets to supply extra torque. The motor/generator, which is acting as motor and actuating on planetary carrier 24 between satellite gears 23, will increase the power available to the wheels of the vehicle.

Figure 6:
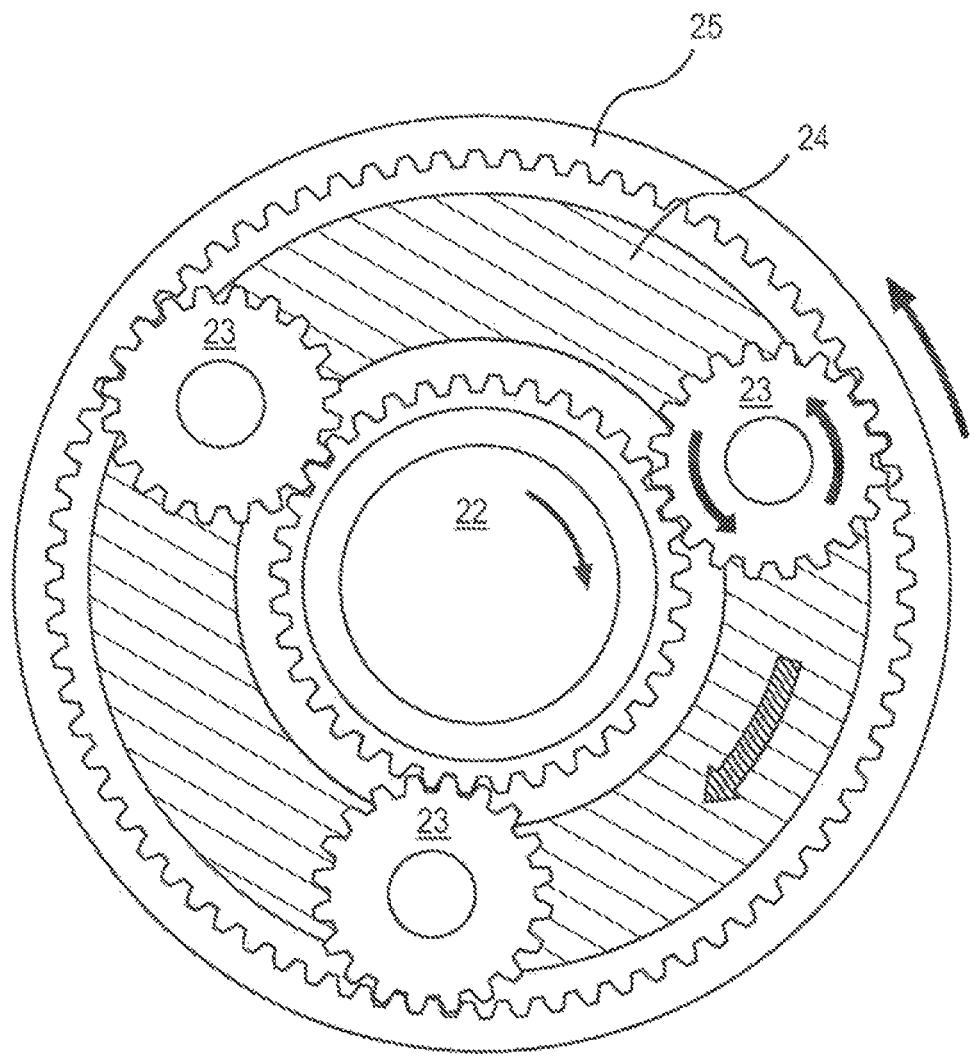
FIG. 6 is a schematic depiction of a planetary gear system of an energy distributor according to embodiments of the invention in the situation where the multi-functional electromechanical device is using power from an internal combustion engine to keep the vehicle running and to generate electricity for storage in an accumulator set, for example in a battery or set of batteries.

FIG. 6 depicts schematically movement of gears within a planetary gear system of the energy distributor of embodiments of the multi-functional electromechanical device during the situation of a stable ride. Without higher energy requirements, the engine is able to move the transmission without assistance of the energy distributor. The energy distributor has planetary carrier 24 rotating in clockwise direction and deriving energy to move the motor/generator set (not depicted), which generates electric power to accumulate and later use in situations like that described in the discussion of FIG. 5. The single force applied to the transmission is generated by the rotation of central shaft 22 driven by the engine. Satellite gears 23 and outer crown 25 are equivalent to those elements as depicted in FIG. 5.

Figure 7:
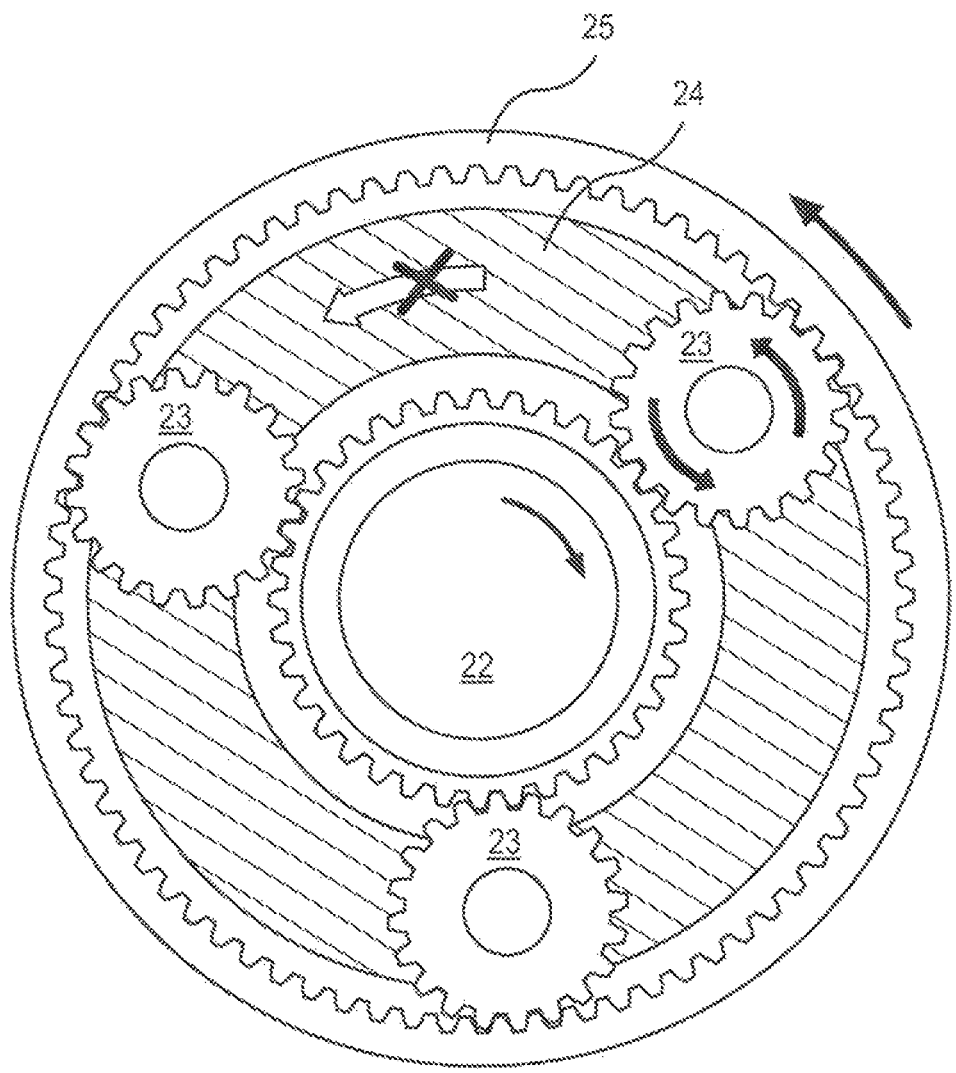
FIG. 7 is a schematic depiction of a planetary gear system of an energy distributor according to embodiments of the invention in a hypothetical situation where the planetary carrier (element 24) is not moving because 100% of the engine's energy is applied to move the transmission.

FIG. 7 depicts schematically movement of gears within a planetary gear system of the energy distributor of embodiments of the multi-functional electromechanical device during the situation in which the engine is used only to move the transmission. It shows how central shaft 22 causes satellite gears 23 to rotate and transfer of the rotational motion to outer crown 25. As can be seen in the figure, planetary carrier 24 is stopped.

Figure 8:
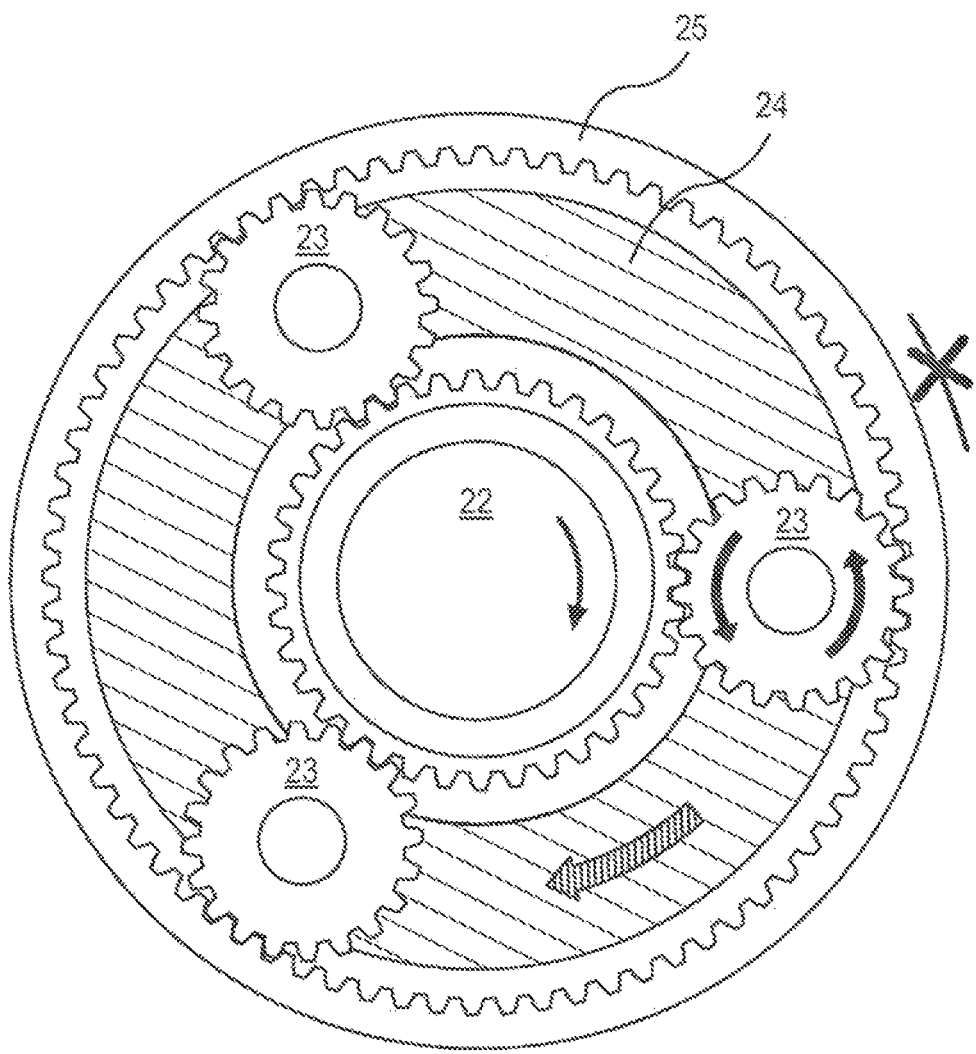
FIG. 8 is a schematic depiction of a planetary gear system of an energy distributor according to embodiments of the invention in the situation where an internal combustion engine linked to the multi-functional electromechanical device of the invention is idling, and where the rotational energy of the internal combustion engine is being used substantially to produce electricity to run parasitic devices and to store electricity in an accumulator set, for example in a battery or set of batteries.

FIG. 8 depicts schematically movement of gears within a planetary gear system of the energy distributor of embodiments of the multi-functional electromechanical device during the situation where the transmission is stopped and the engine is dedicated to move the energy distributor. It shows central shaft 22 rotating clockwise, causing satellite gears 23 to rotate counterclockwise. As depicted in the figure, outer crown 25 is arrested, and planetary carrier 24 rotates clockwise.

Figure 9:
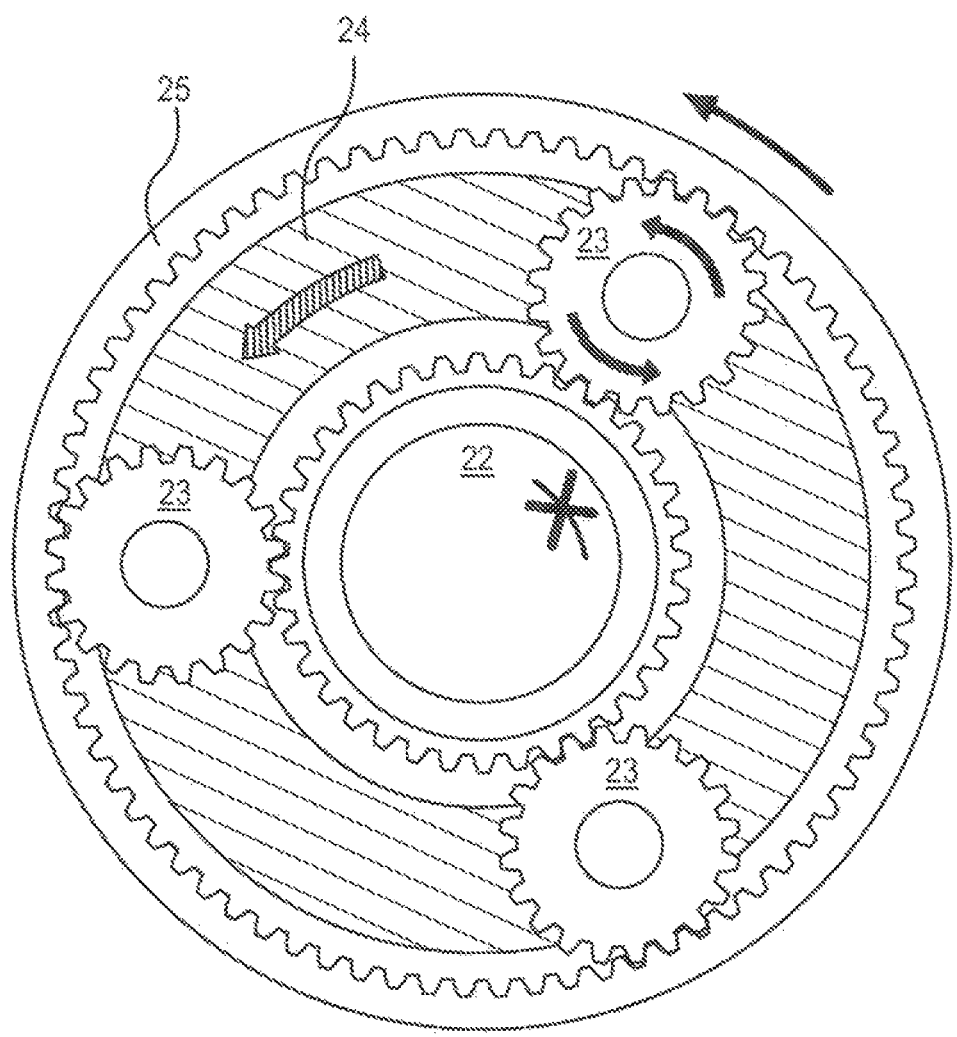
FIG. 9 is a schematic depiction of a planetary gear system of an energy distributor according to embodiments of the invention in the situation where an internal combustion engine linked to the multi-functional electromechanical device of the invention is reducing its speed and the engine is disengaged from the planetary gear system, and where energy from the transmission is used to drive the motor/generator set to generate electricity.

FIG. 9 depicts schematically movement of gears within a planetary gear system of the energy distributor of embodiments of the multi-functional electromechanical device during the situation of deceleration. The figure shows central shaft 22 uncoupled from the engine by way of a clutch, torque converter, or the like (depicted in FIG. 10) and completely stopped. Outer crown 25 rotates counterclockwise, causing satellite gears 23 and planetary carrier 24 to move counterclockwise. This movement of gears allows the ECU to activate the generator mode through the motor/generator set.

Figure 10:
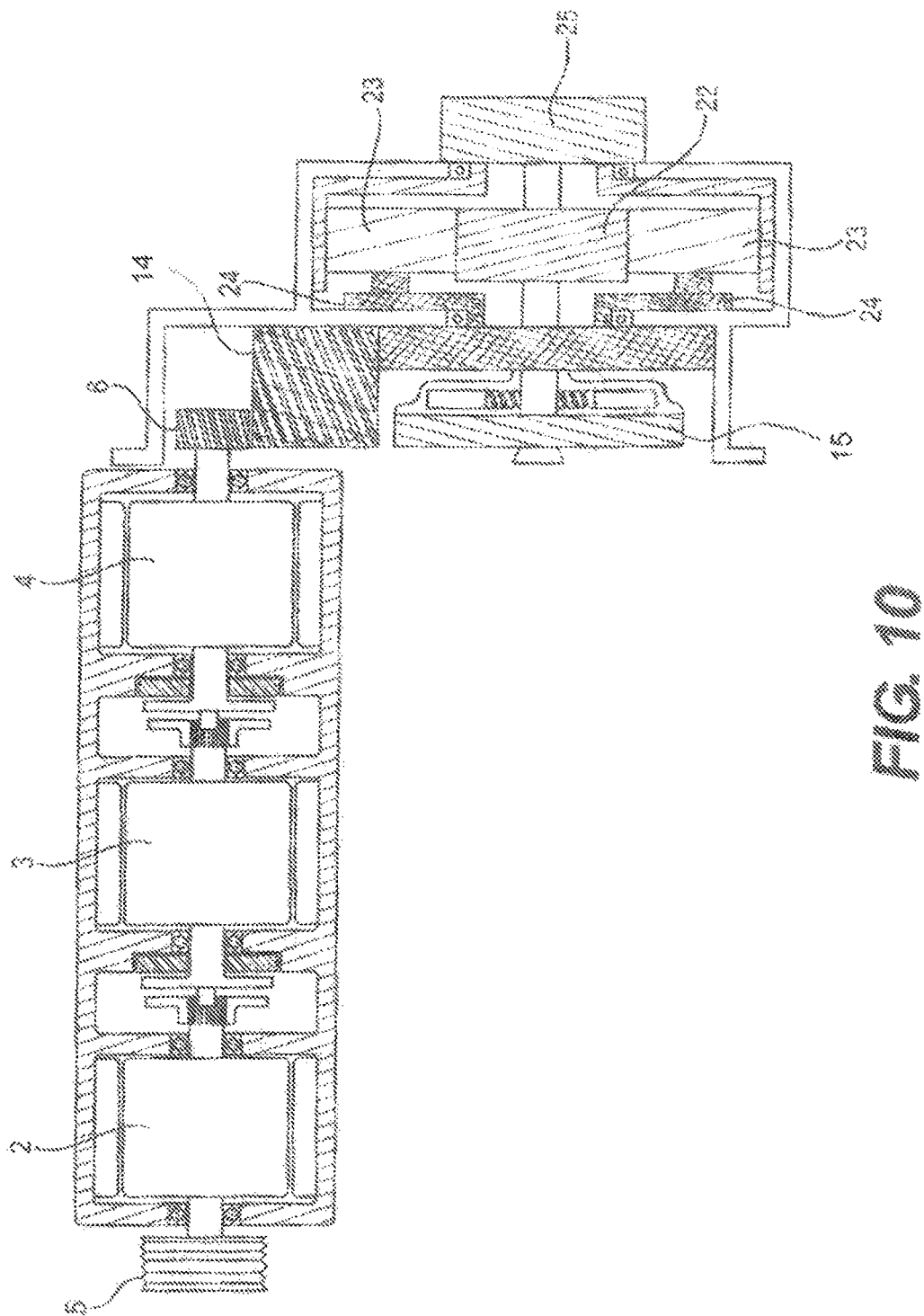
FIG. 10 is a cut-away view of an exemplary combination of an embodiment of the electromechanical device of the invention coupled to an internal combustion engine (not shown).

FIG. 10 depicts a cut-away view of an embodiment of the multi-functional electromechanical device of the invention, including both an energy distributor and a motor/generator set. As mentioned above, a motor/generator set comprising rotors 2,3,4 and pulley 5 is mechanically connected to an energy distributor by way of connector 6. Connector 6 is mechanically connected to gear 14, thus allowing rotation of either element to cause rotation of the other element. Details of the various modes of operation of the multi-functional electromechanical device according to embodiments of the invention are detailed above with regard to the other figures. It is to be noted that outer crown 25 connects to the transmission (not depicted) and allows coupling of the transmission to the energy distributor and thus to the motor/generator set. FIG. 10 further depicts mechanical clutch 15, which connects the multi-functional electromechanical device to the internal combustion engine (not depicted), and which functions to couple and decouple the rotational movement of the internal combustion engine and the transmission.

The energy distributor depicted in the figures can comprise a central driving shaft, which is connected via a coupling and uncoupling mechanism with the internal combustion engine. The central shaft preferably has helical teeth, engaged in a gear group of smaller diameter and similar gear toothing, which are twinned with the central driving shaft. This group of satellite gears are connected by a ring that keeps them equidistant. The ring is attached to the overall power take off of the motor/generator set. On the outside, this group of satellite gears has a crown gear with toothing on the inside, which is engaged with the group of satellite gears and is connected to the vehicle transmission. In the assembled energy distributor, all of the central shaft, the satellite gears, and the outer crown gear are related distributors.

Although the present multi-functional electromechanical device is suitable for use in combination with any type of internal combustion engine, in non-limiting preferred embodiments, the engine associated with the present multi-functional electromechanical device system is one encompassed by the engines disclosed in either or both of U.S. Pat. No. 8,789,499 and PCT patent application number PCT/US2016/034502. Both of these documents are hereby incorporated herein in their entireties. As disclosed in the documents, each of the disclosed engines can have a relatively compact size compared with other engines currently known in the art. In such embodiments, the present multi-functional electromechanical device, because it can be integral to the engine, transmission, or both, allows for alternative, reduced number, and more space-efficient placement of batteries, as compared to other MHS known in the art. In these embodiments, the use of a 48 volt system conserves space and weight, and thus further provides an improvement over the current standard 60 volt (or higher) hybrid systems available in the art. It is to be clearly understood, however, that the multi-functional electromechanical device of the present invention can be fully integrated into any internal combustion engine and design, while still providing as-yet unrecognized advantages in energy distribution and fuel economy and efficiency. The present invention thus clearly reduces carbon emission from internal combustion engines currently available in commerce, and is highly suitable for reduction of the "carbon implant" of countries that utilize the technology. The contribution toward reducing carbon emissions is related not only to the device of the present engine, but to the engine with which it is associated. In essence, employing the present device with an engine allows the use of a smaller engine that otherwise would be needed. The smaller engine, with will produce equivalent power as a larger engine lacking the device, will produce less carbon emissions. This concept is equally applicable to internal combustion engines used in vehicles as well as internal combustion engines that are stationary, such as those that can be used in machine shops or other industrial settings.

The multi-functional electromechanical device and the MHS referred to herein, in preferred embodiments, will have the ability to be plugged into an external electrical power source, allowing, in such a situation, to recharge the accumulator set to its full storage capacity.

In embodiments, the multi-functional electromechanical device can be linked to an engine through a gear, chain, belt, or any other mechanical coupling element that has the ability to start the engine. Although in exemplary embodiments, the multi-functional electromechanical device is disclosed as being capable of starting an internal combustion engine, it is to be recognized that a conventional starter may be used instead of the multi-functional electromechanical device. The multi-functional electromechanical device can have the ability to transmit and modulate power produced by the engine to the transmission and/or to an accumulator set, such as a battery.

As a general, non-limiting summary of operation of the multi-functional electromechanical device of the invention within the context of a vehicle comprising an internal combustion engine and a transmission, once the engine is started, the vehicle will be set to move, for which, the engine's flywheel will couple with the transmission to transmit power in proper relationship to the vehicle's differential assembly. The power applied will be managed by an ECU, which will sense the energy available in one or more accumulator sets, and will deliver it in accordance to a predefined program (as mentioned above, typically set by the manufacturer to achieve desired parameters for marketing of the vehicle). Depending on the demand from the acceleration command to the ECU, the ECU will apply accumulated energy to one, two, or more motor/generators of the multi-functional electromechanical device, so that one or more of the motor/generators function as motors, delivering rotary power by way of rotation of one or more rotors as a mechanical means for power distribution to drive the vehicle via the engine and/or the transmission. In such a situation, the vehicle's acceleration will be the result of the combination of the power delivered by the engine and the multi-functional electromechanical device.

Once the acceleration requirement is finished, that is, when the vehicle reaches a stable speed range, the ECU will manage changes in system operation, as is known in the art. For example, at first, the ECU could gradually override instruction of delivery of energy to the rotor or rotors, for example by way of the stators in the motor/generator sets, which until then functioned as motors. According to the evaluation that the ECU would perform, between necessary replacement of the consumed energy from the accumulator set and remaining energy unapplied from the engine to the transmission (sensing, for example, rpm), the ECU could gradually activate the electrical regeneration up to fulfil the accumulator set storage capacity or until the next time of acceleration required by the user, whichever comes first, in which once again the cycle of applying electrical energy stored in rotary motion will start.

The motor/generator set enables the system to regenerate energy when activating brakes and during vehicle deceleration. The regeneration process starts when the acceleration command is released, with the ECU's instruction to decouple the engine's flywheel from the transmission and at slowdown intervals, the coupling with the powertrain electrical system is maintained, generating power derived for storage in the accumulator set.

This system is, in embodiments, completely independent from the braking system of the vehicle, although it can take advantage of the braking system. In embodiments, energy generation can benefit by the contribution of the transmission's rpm reduction, a situation that is widely known and used by vehicles of medium and large size that use engine-braking.

Concerning a hypothetical circumstance, the performance of a preferred embodiment can comprise three motor/generator sets and a situation, as follows. The engine is started, so one or all of the rotors of the motor/generator sets deliver driving force to rotate the engine and consume electrical energy for it. When the level of revolutions of the engine and transmission indicate that the vehicle is ready to move, again the rotors deliver power assistance to the engine to start moving the vehicle, the motor/generator now acting as a motor.

Once the vehicle has reached the desired speed, acceleration normally decreases and the ECU detects that no additional power assistance is required. In this circumstance, it will disable power delivery to a motor of the motor/generator set of the multi-functional electromechanical device.

In the next situation, if the ECU senses that there is no variation and the required speed is kept, the ECU disables the next motor of the motor/generator set.

In another situation, the vehicle may be in an upward slope, in which the speed of the vehicle tends to diminish. To maintain the speed, the driver should increase the acceleration command, or, if the speed is being established by a speed control system, the ECU should increase the number of rpm to compensate for any loss in speed. According to the present invention, the ECU instructs one or more motor/generators of the motor/generators set to function as motors to provide assistance to the engine under this situation.

In situations where acceleration is not involved and/or power energy delivery has been achieved, the ECU evaluates the appropriate time to apply one or more motor/generators of the motor/generator set of the multi-functional electromechanical device of the invention as a generator to compensate for the energy used during acceleration. According to the invention, the ECU is programmed to deliver commands to the appropriate mechanical, electrical, and electromechanical units that can execute and supply the desired needs of the ECU. Such mechanical, electrical, and electromechanical functions are well known in the art and need not be detailed herein. In situations where applying one of the motor/generators as a generator does not diminish the vehicle's speed, and where the accumulator set is not in a fully charged state, the ECU can apply the second motor/generator as a generator to replenish the charge of the accumulator set.

The online sensed and processed information allows the ECU to efficiently manage available resources to optimize performance and maintain energy balance. It allows the vehicle, at times when more power is required, to use electromotive assistance for the engine and storage of remaining power energy. The modular configuration of relatively small motor/generators, of selective use, individual and/or jointly, and indistinct, favors that power energy accumulation can be captured, even when dealing with small intervals or loads.

In a preferred embodiment, the MHS combination discussed herein, in which the internal combustion engine is a compact engine, as referenced above or by others, with an electrical system capable of functioning as a motor, or as a generator, or both at the same time is provided. It enables a reduction in a coupled engine's cubic capacity and therefore consumption of fuel and emissions of carbon dioxide and pollutants, without affecting the vehicle's performance. This is achieved by delivering power at acceleration intervals and by lessening the burden on the engine itself to power parasitic devices. Therefore, the presently disclosed configuration equipped with relatively small motor/generators allows the rational use of energy. Using relatively small motor/generators with suitable electronic firmware and software favors optimum use and energy balance, increasing the autonomy of the vehicle and thereby reducing emissions and operating costs.

In view of the disclosure above and the accompanying figures, the practitioner will understand that the present invention encompasses a multi-functional electromechanical device that includes: A) a first assembly that includes at least one motor/generator set configured to act as both: i) a motor to provide rotational assistance to an engine to which it is connected by converting electrical energy from an accumulator set to rotational energy, and ii) a generator configured to act to generate electrical energy to run parasitic devices of the engine to which it is connected, to store in an accumulator set, or to act in both of these capacities, using rotational energy provided by the engine or the transmission; and B) a second assembly that includes at least one energy distributor configured to: i) use rotational energy provided by at least one motor/generator set to move/rotate and/or assist an engine to which it is connected or a transmission to which it is connected to rotate, or ii) use rotational energy of an engine or a transmission to which it is connected to provide rotational energy to at least one motor/generator set to convert the rotational energy into electrical energy for use by parasitic devices or for storage in an accumulator set, wherein the first assembly and the second assembly are physically connected. In embodiments, the device can comprise two or more motor/generator sets. In such embodiments, each of the motor/generator sets can be independently and coordinately controlled by one or more ECU connected to the motor/generator sets. In an exemplary embodiment, the device comprises three motor/generator sets. The practitioner will further understand that the second assembly can be connected to both an internal combustion engine and a transmission, and can comprise means for decoupling power train movement of the internal combustion engine and the transmission. The invention further comprises all types of internal combustion engines comprising the device of the invention, as well as all vehicles (terrestrial vehicles, aquatic vehicles, aircraft) comprising the device of the invention.

Yet further, in view of the disclosure above and the accompanying figures, the practitioner will understand that the present invention encompasses a method of moving a vehicle, wherein the vehicle includes an internal combustion engine and a transmission, and where the method comprises applying rotational energy provided by an energy distributor to the transmission, causing rotational movement of the transmission and resulting in movement of the vehicle. In embodiments, the vehicle comprises multi-functional electromechanical device that is capable of moving a vehicle that comprises at least one means of propulsion, such as a wheel or a propeller, that, when caused to move, causes movement of the vehicle. In embodiments and in the case of a terrestrial vehicle, movement is achieved when a wheel is in contact with a surface. In embodiments, the internal combustion engine is not running and movement of the vehicle is caused by engagement of the device with the transmission. In exemplary embodiments, the vehicle is an automobile and movement of the is at least about 100 meters, preferably at least about one kilometer. In embodiments, rotational movement of the transmission does not cause rotational movement of the internal combustion engine. Furthermore, in embodiments, the rotational energy of the energy distributor is provided through at least one motor/generator set by way of at least one accumulator set.

A person of skill in the art will understand that both the figures and coupling systems between rotors, like any other elements indicated herein, are only an explanation of some of the preferred applicable arrangements. It is to be understood that the scope of the invention includes a modular and selective set of functions, acting at times as both a generator and as a motor, through the use of a set of rotors independently or jointly organized in a single outer body, that function according to the energy requirements and the potential for energy recovery, led by an ECU, and linked both to the engine and the transmission by a power distributor mechanism to improve the performance of a hybrid drive unit.

The new electromechanical device may be used in conjunction with a new selector, doser and transmitter of torque and power between one or more engines and one or more final transmission shafts to avoid the need for a gearbox. A system incorporating such a selector, doser and transmitter of torque and power is described below.

Description of Elements and Links Between them

A motor power source, motor, machine or mechanism generating a rotational movement—hereinafter "Motor"—is preferably connected to the SUN (central gear) and can apply a selective brake and/or clutch mechanism in a planetary gear train (epicyclic gear) alternatively: by direct connection; through the use of a reductive-multiplier-box; by chain; by means of a belt and/or by any alternative means that fulfills a binding function. This Motor, in turn, can also be connected by any binding means to another driving source, which can be an electric machine, —hereinafter referred to as "EM1"—and also applies in its connection a clutch mechanism that acts for selectively coupling and decoupling; it can also be coupled to another satellite gear train. The Carrier (traveling gears linking the SUN to the RING) can be linked by any means appropriate to the shaft or final transmission mechanism, being able to do so without the use of a gearbox. The Ring (outer gear), linked to a selective activation brake and/or clutch mechanism, can be linked by any suitable means to a second power source, that could be electrical, —henceforth EM2—which may also be linked to the EM1 in an occasional or continuous manner through any linking mechanism that allows them to uncouple and rotate at different rpm or to be coupled and rotate at the same rpm, and can also be linked to another satellite mechanism of gears.

Figure 11:
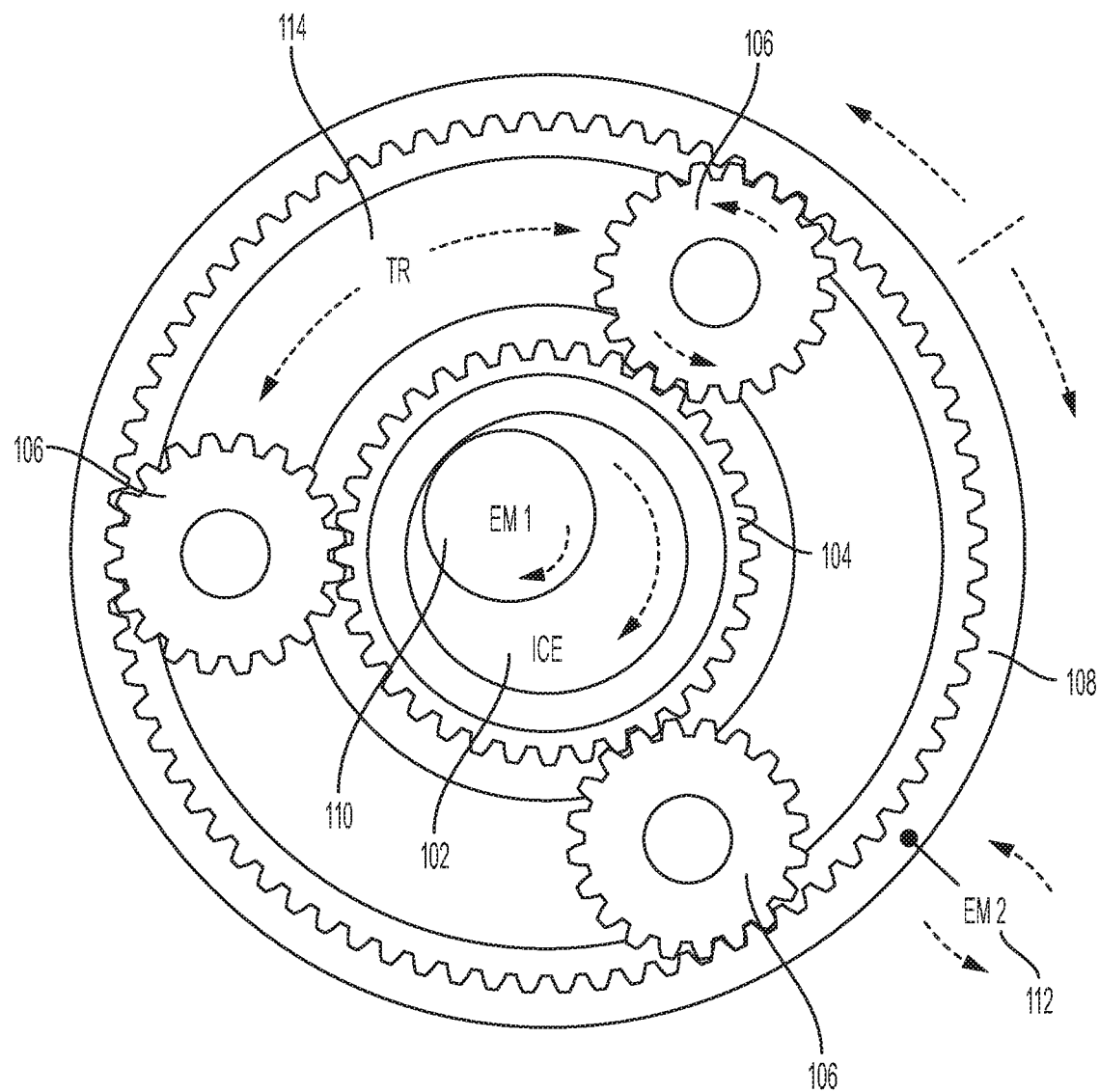
FIG. 11 represents an exemplary planetary gear system embodiment, where EM1 is linked to the SUN, the output to the final transmission shaft (TR) and direction of indicated rotation of the final transmission shaft (TR) being equal to the direction of rotation of ICE and EM1, and EM2 being attached to the Ring and able to rotate in either direction.

FIG. 11 shows such an embodiment, with an internal combustion engine 102 (ICE) generating a rotational movement and connected to a central gear 104 and that can apply a selective brake and/or clutch mechanism in a planetary gear train (epicyclic gear) 104, 106, 108. The ICE 102 is also connected by a binding means to an electric machine (EM1) 110. The traveling gears 106 linking the central gear 104 to the ring gear 108 are linked to a final transmission mechanism 114 without the use of a gearbox. Outer gear 108, linked to a selective activation brake and/or clutch mechanism, is linked to a second electric machine (EM2) 112, which may be linked to the EM1 110 in an occasional or continuous manner through a linking mechanism that allows them to uncouple and rotate at different rpm or to be coupled and rotate at the same rpm, and can also be linked to another satellite mechanism of gears. The output to the final transmission shaft (TR) 114 and direction of indicated rotation of the final transmission shaft (TR) 114 is equal to the direction of rotation of ICE 102 and EM1 110, and EM2 112 is attached to the Ring and able to rotate in either direction.

Figure 15:
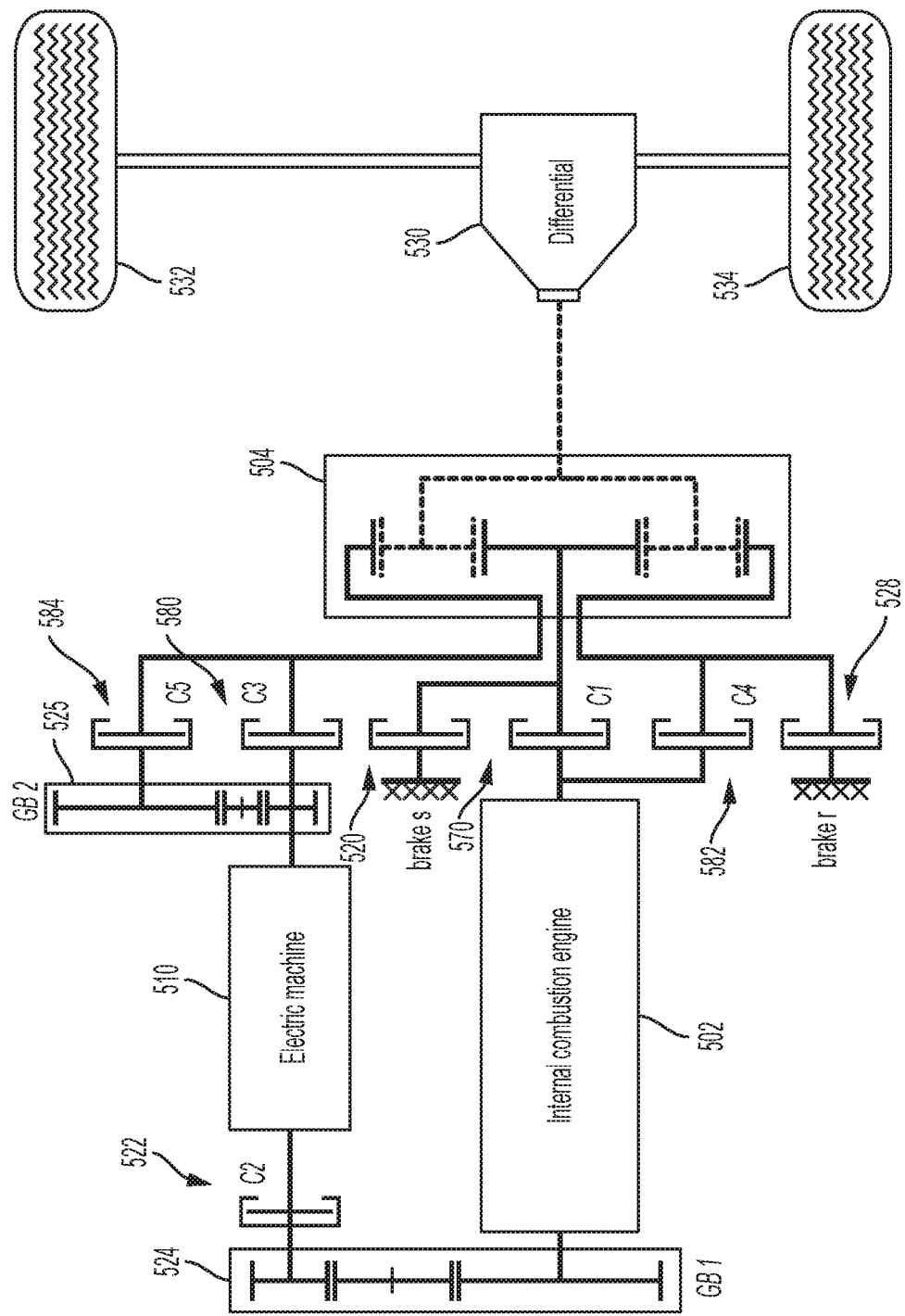
In FIG. 15, multiple clutches and binding gears can be observed between the energy sources ICE and EM, and the satellite gear, allowing different configurations of the assembly, according to the requirement of use and selection of rpm required in the entry to the final axis of transmission. The motor 502 is connected to multiplier box 524, which is connected through clutch C2 522, which is connected to an Electric Machine 510 which is connected to another multiplier box GB2 525, which is connected to clutches C3 580 and C5 584 to the Ring of the planetary gear 504. The motor 502 is also connected through a Clutch C1 570 to the Sun of the planetary gear 504, which is connected to the Brake S 520. The Motor 502 is connected through the Clutch C4 582 with the ring of the ring of the planetary gear 504, which is connected to the Brake R 528. The Carrier of the planetary gear 504 is connected to differential 530.

In FIG. 15, multiple clutches and binding gears can be observed between the energy sources ICE and EM, and the satellite gear, allowing different configurations of the assembly, according to the requirement of use and selection of rpm required in the entry to the final axis of transmission. The motor 502 is connected to multiplier box 524, which is connected through Clutch C2 522, which is connected to an Electric Machine 510 which is connected to another multiplier box GB2 525, which is connected to Clutches C3 580 and C5 584 to the Ring of the planetary gear 504. The motor 502 is also connected through a Clutch C1 570 to the Sun of the planetary gear 504, which is connected to the Brake S 520. The motor 502 is connected through the Clutch C4 582 with the ring of the ring of the planetary gear 504, which is connected to the Brake R 528. The Carrier of the planetary gear 504 is connected to differential 530.

Mode of Operation with One or More Auxiliary Motors of the Motor

To move the vehicle, the Motor connected to the Sun and/or the Sun and to the EM1 is put into operation. In such circumstances, the Motor rotating at a certain rpm causes the EM1 associated to it to also rotate at the same or a different rpm, depending on the linkage relationship selected. The EM1 and EM2 remain dissociated at this time, and the brake is applied to the Ring, which causes the Carrier to rotate at a lower rpm than the SUN while the RING remains stopped by the applied brake. The rpm of the Carrier can be applied, for example, directly to the differential of a vehicle, since the use of the new mechanism makes it possible to dispense with the use of a conventional transmission with gearbox.

If acceleration continues, the number of rpm of the Motor and/or its EM1 will continue to rise. In such circumstances, it is necessary to reduce the reduction, so that at a given number of revolutions of the Motor, the reduction is lower and determines that the output rpm of the Carrier increases. This is achieved by releasing the brake in the Ring and starting from zero rpm in the ring to increase the rpm in the EM2 in the same direction of rotation as the SUN. Remember that the EM2 can turn at a different rpm than both the Motor and the EM1. A sharp comparative increase of the rpm of the Carrier with respect to the SUN is then obtained. Again, if continued acceleration of the vehicle is desired, the rpm of the Motor and/or the EM1 can be increased or the rpm of the EM2 can be increased in the same direction as the motor, or we can also increase the rpm of the Motor and the EM2 in equal or different amounts. If the Motor is kept at a certain rpm, and the rpm of the Carrier is increased, for which the rpm of the Ring and its associated EM2 must be increased, eventually the time will come when the rpm of the EM2 and the Motor are equal, resulting in a triple parity with the Carrier, causing a direct relation between rpm delivered by the Motor and/or EM1 and the rpm delivered by the mechanism of the present invention. To further increase the speed of the vehicle without increasing that of the Motor and/or EM1, or to maintain the speed of the vehicle while decreasing the rpm of the Motor or Motors, the rpm of the EM2 must exceed the SUN rpm, which results in a delivery to the final transmission shaft—or shaft of final reduction—of a higher number of rpm than those delivered by the Motor. To carry out a reverse motoring, there are two options, to stop the SUN and make the EM2 turn in the opposite direction to the forward gear—opposite to that of the Motor when it is running—turning the Ring in the opposite direction to the forward gear, or to rotate the Motor and the EM2 turning in the opposite direction to a number of rpm higher than the Motor and produce reverse rotation to the CARRIER output, causing reverse movement of the vehicle.

Mode without Auxiliary Electrical Machines of the Motor

Figure 13:
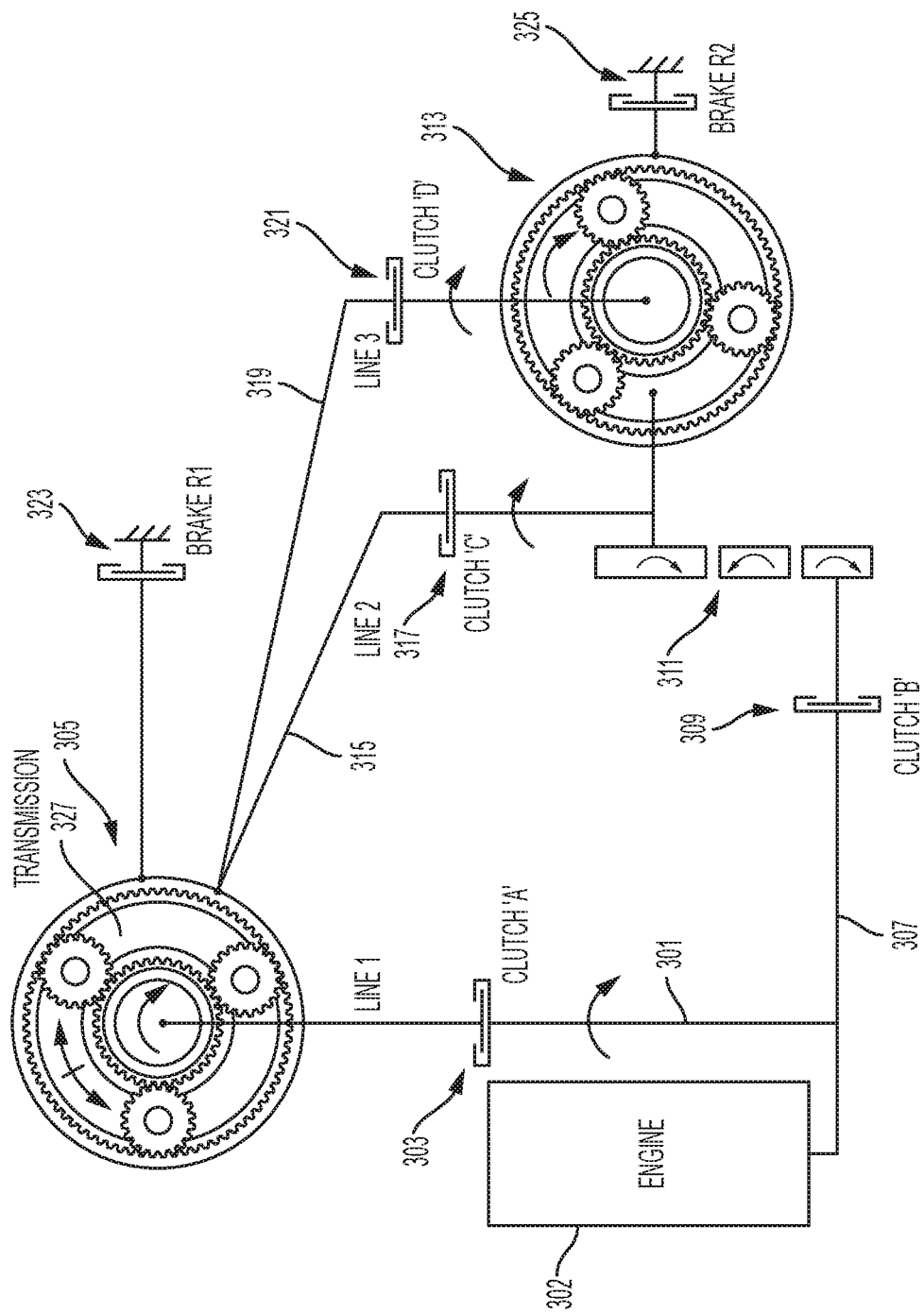
FIG. 13 represents another exemplary connection diagram, where on line 1, a Motor is connected through a clutch with the SUN1 of a first planetary gear system and by a second connection through a clutch and a gear reducer assembly to the Carrier 2 of a second planetary gear system. Line 2 shows the connection between Ring 1 of the first planetary system and the output of the gear reducer assembly passing through clutch C; in line 2 we appreciate the connection through a clutch D between SUN 2 of the second planetary system and Ring 1 of the first planetary system; there is also a brake 1 in Ring 1 and a brake 2 in Ring 2.

An embodiment that does not utilize electric machines is shown in FIG. 13. FIG. 13 represents another exemplary connection diagram, where on line 1 301, a Motor 302 is connected through a clutch 303 with the SUN1 of a first planetary gear system 305 and by a second connection 307 through a clutch 309 and a gear reducer assembly 311 to the Carrier 2 of a second planetary gear system 313. Line 2 315 shows the connection between Ring 1 of the first planetary system 305 and the output of the gear reducer assembly 311 passing through clutch C 317. Line 3 319 shows a connection through a clutch D 321 between SUN 2 of the second planetary system 313 and Ring 1 of the first planetary system 305; there is also a brake 1 323 in Ring 1 and a brake 2 325 in Ring 2.

For the sole purpose of facilitating the understanding of this explanation and as an example, in an embodiment the diameter of the Ring is twice the diameter of the SUN, but different ratios between the elements of a single satellite group can be applied depending on the situation and requirements. As such, in embodiments utilizing more than one planetary group (e.g. 305, 313), the planetary groups 305, 313 can be equal to each other or different, both in the dimensions of their elements and in their connections. The engine(s) 302 (hereinafter: the Motor) is linked, for example, to a SUN—henceforth SUN1—of a first satellite group of gears 305 with the use of a Clutch A 303, the Carrier1 is connected to the final transmission shaft 327, and the Ring1 to a Brake R1 mechanism 323. Also the Motor 302 is linked by suitable means, for example a shaft with a Clutch B mechanism 309, to a second planetary group of gears 313 through a gear reduction mechanism 311, more precisely to the Carrier2 and to the Ring1 interposing another Clutch C 317. While the SUN2 of the second satellite group 313 has a clutch 321 connected through the Ring1 of the first satellite group 305, the Ring2 of the second satellite group 313 connects to a Brake R2 325.

In these or similar conditions, the Motor 302 starts, and when accelerating to move the vehicle, the following directives are activated through the commands of a control unit, for example ECU: Motor 302 coupled to SUN1, Clutch B 309 open, Brake R1 325 activated, so that for each revolution of the engine, the output to the final transmission shaft will be ⅓ of a revolution. When continuing the acceleration, the instructions are for example: Motor 302 direct to SUN1, clutch A, B, C, 303, 309, 317 closed, Brakes R1 and R2 323, 325 deactivated, and if the reduction is 2:1 there is a ratio of 1 rpm SUN1 to ½ rpm Ring 1. 1 rpm SUN1 plus ½ rpm RING1 is equal to ⅔ rpm in the Carrier's output to the final transmission shaft 327. To continue accelerating the vehicle, with instructions clutch A 303 is closed, clutch B 309 opened, Brake R1 323 is deactivated, and Sun1 is blocked with Carrier1, obtaining a ratio of 1 rpm of the Motor 302 to 1 rpm output to the final transmission shaft 327. To deliver to the final transmission shaft 327—or final reduction shaft—higher rpm than those delivered by the Motor 302, the following instructions for example may be used: Clutch A, B and D 303, 309, 321 closed, Clutch C 317 open, Brake R1 323 deactivated, Brake R2 325 activated. In such circumstances, 1 rpm of the Motor 302 corresponds to 1 rpm of the Sun1, ½ rpm of Carrier2, 1½ rpm of SUN2, 1½ rpm of Ring1, and 1⅓ rpm of Carrier1 output to the final transmission shaft 327.

Mode of Operation with Only One Electric Motor

For the sole purpose of facilitating the understanding of this explanation and by way of example, in an embodiment the diameter of the ring is twice the diameter of the sun, although in different situations with different requirements, different relationships between the elements of the same or different satellite group may prevail. This mode of operation allows that when the Motor is connected to the Sun, it rotates causing the final transmission shaft to receive ⅓ of the Sun's rpm. To increase the ratio between rpm in the Sun and rpm in the output of the Carrier, in a preferred configuration, by coupling an electric motor to the Ring, which manages its rpm in the same direction as the Sun and the Carrier, for example by an electronic command unit (ECU), it is possible from a previous situation with a stopped Ring to gradually increase the rpm of the electric motor, increasing then gradually the RPM of the Carrier, until the point at which the rpm of the electric motor equals those of the Motor and the Sun, in which the rpm of these, the Carrier and the Rings are equal, allowing a 1:1 ratio between Motor rpm and rpm to the final transmission shaft. If it is desired to obtain a multiplied gear, it is sufficient to overcome the RPM in the electric motor associated with the Ring with respect to the Sun. To generate a reverse gear, it is necessary to make the electric motor coupled to the Ring turn in the opposite direction to that of the Sun and the Carrier.

Figure 16:
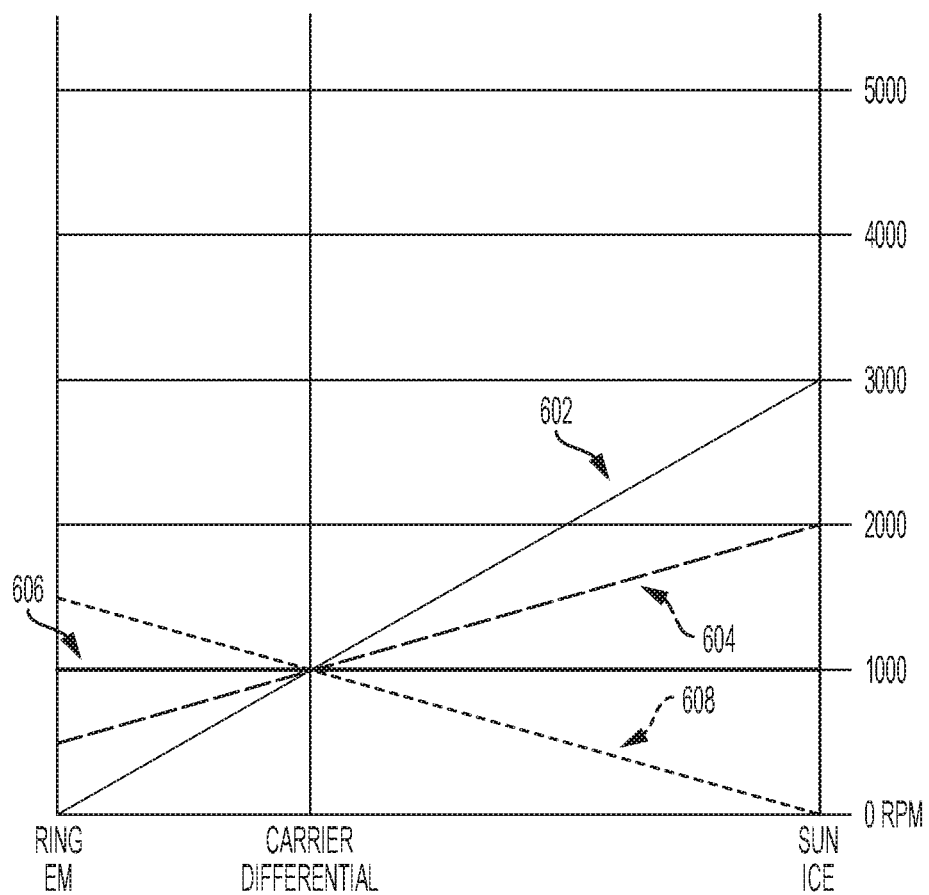
FIG. 16 is a graphical representation of an operational mode of an embodiment of the present invention with a single electric machine, where the sun gear is connected to the motor and the ring gear is connected to the electric machine, and the diameter of the ring gear is twice the diameter of the sun gear, depicting different ways that the rpm of the motor and electric machine can be blended to achieve a desired output rpm to a differential.

FIG. 16 is a graphical representation of an operational mode of an embodiment of the present invention with a single electric machine, where the sun gear is connected to the motor and the ring gear is connected to the electric machine, and the diameter of the ring gear is twice the diameter of the sun gear, depicting different ways that the rpm of the motor and electric machine can be blended to achieve a desired output rpm to a differential. Here, the desired output rpm at the carrier/differential is 1000 RPM. In order to achieve this output rpm for this particular planetary gear system, various speeds of the motor (SUN/ICE) and electric machine (RING/EM) can be selected by a control unit (such as ECU). A first option 602 has the motor at 3,000 rpm and the ring gear stationary at zero rpm. A second option 604 has the motor running at 2,000 rpm and the ring gear maintained at 500 rpm. A third option 606 has both the motor and electric machine running at 1,000 rpm. A fourth option 608 has a stationary motor at zero rpm and an electric machine running at 1,500 rpm. Each of these options results in an output rpm of 1,000 at the carrier. Of course, an infinite number of alternative options exist between option 1 and option 4 (between zero and 3,000 rpm for the motor and between zero and 1,500 rpm for the ring gear). The relationship illustrated is that the carrier rpm is equal to ⅔ of the ring gear rpm plus ⅓ of the sun gear rpm, which is a result of the relative dimensions of the components (ring gear twice the diameter of the sun gear). The control unit may select from these options at any point in time for maximum efficiency or based on other considerations. It should be understood that, in addition to being affected by other gears in the system, the angular velocity (rpm) of a gear connected to an ICE may be affected by motoring the connected ICE or by mechanical/friction braking, and that the angular velocity of a gear connected to an electric machine may be affected by motoring the connected electric machine in either direction (i.e. motoring or motorized braking), or by regenerative braking or friction or other mechanical braking. Operating Mode: Only Electric.

Figure 12:
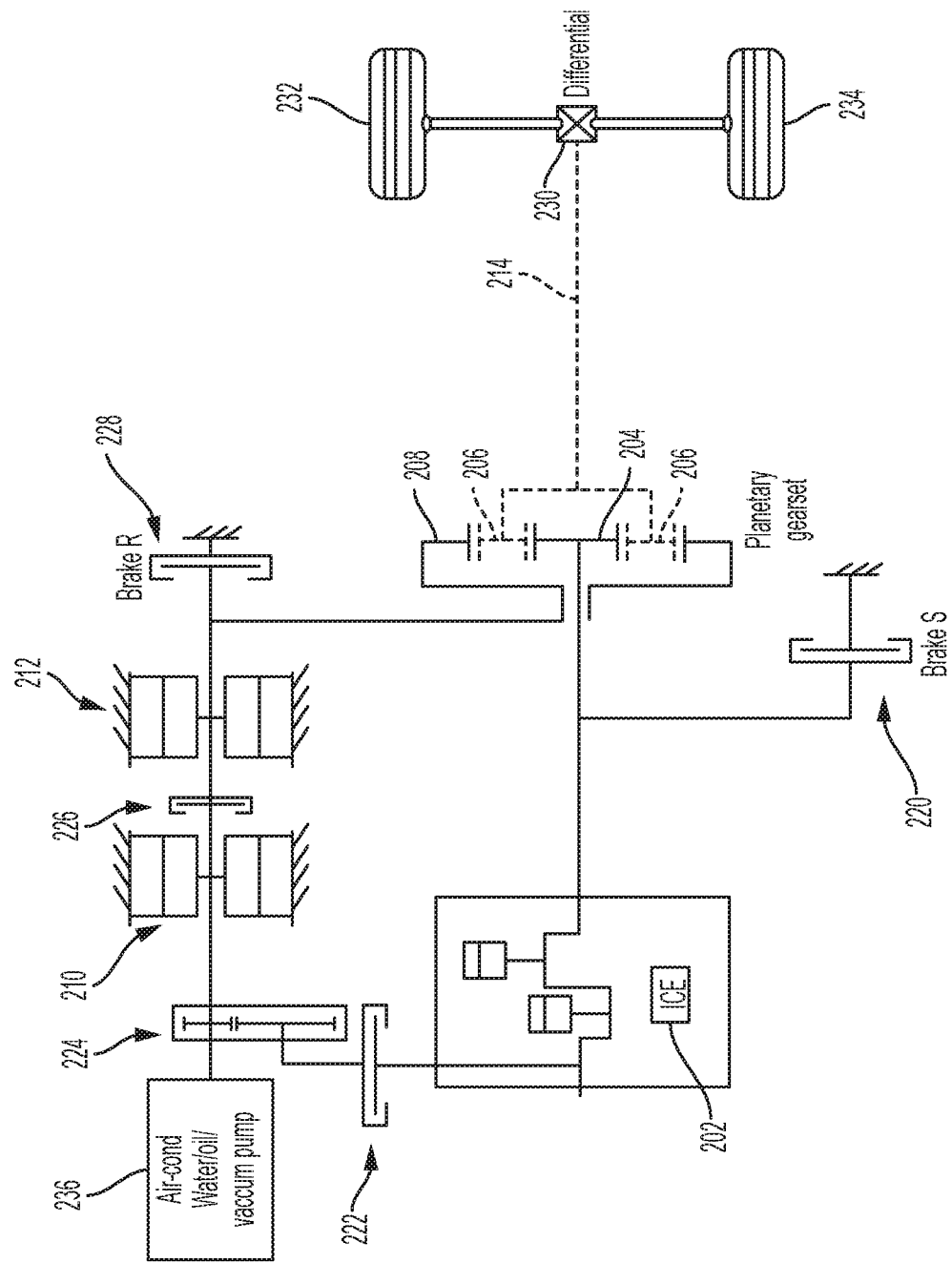
FIG. 12 represents an exemplary connection diagram, where the Motor is connected to a multiplier box through a clutch, and to the Sun of a planetary gear system, which is also connected to a brake. The multiplier box is connected to the EM1, which is connected through another clutch with the EM2, which is connected to a brake and the ring of the planetary gear system. The Carrier of the planetary gear system is directly connected to the final transmission shaft.

FIG. 12 represents an exemplary connection diagram, where the ICE 202 is connected to a multiplier box 224 through a clutch 222, and to the central gear 204 of a planetary gear system 204, 206, 208, which is also connected to a brake 220. The multiplier box 224 is connected to the EM1 210, which is connected through another clutch 226 with the EM2 212, which is connected to a brake 228 and the ring 208 of the planetary gear system 204, 206, 208. The Carrier 206 of the planetary gear system 204, 206, 208 is directly connected to the final transmission shaft 214. Final transmission shaft 214 directly drives differential 230 which drives the wheels 232, 234. Multiplier box 224 connects air-conditioner, water/oi/vacuum pump 236 to EM1 210 and ICE 202.

In a hybrid vehicle configuration, similar to the one described in FIG. 12, in case operation is required with the Motor (here ICE 202) off, the Sun Brake is activated (brake S 220) and the clutch 222 is disengaged between the Motor 202 and EM1 210; in such a situation it is possible to move the Carrier 206 connected to the final transmission shaft 214 with one or both electric motors 210, 212.

Figure 14:
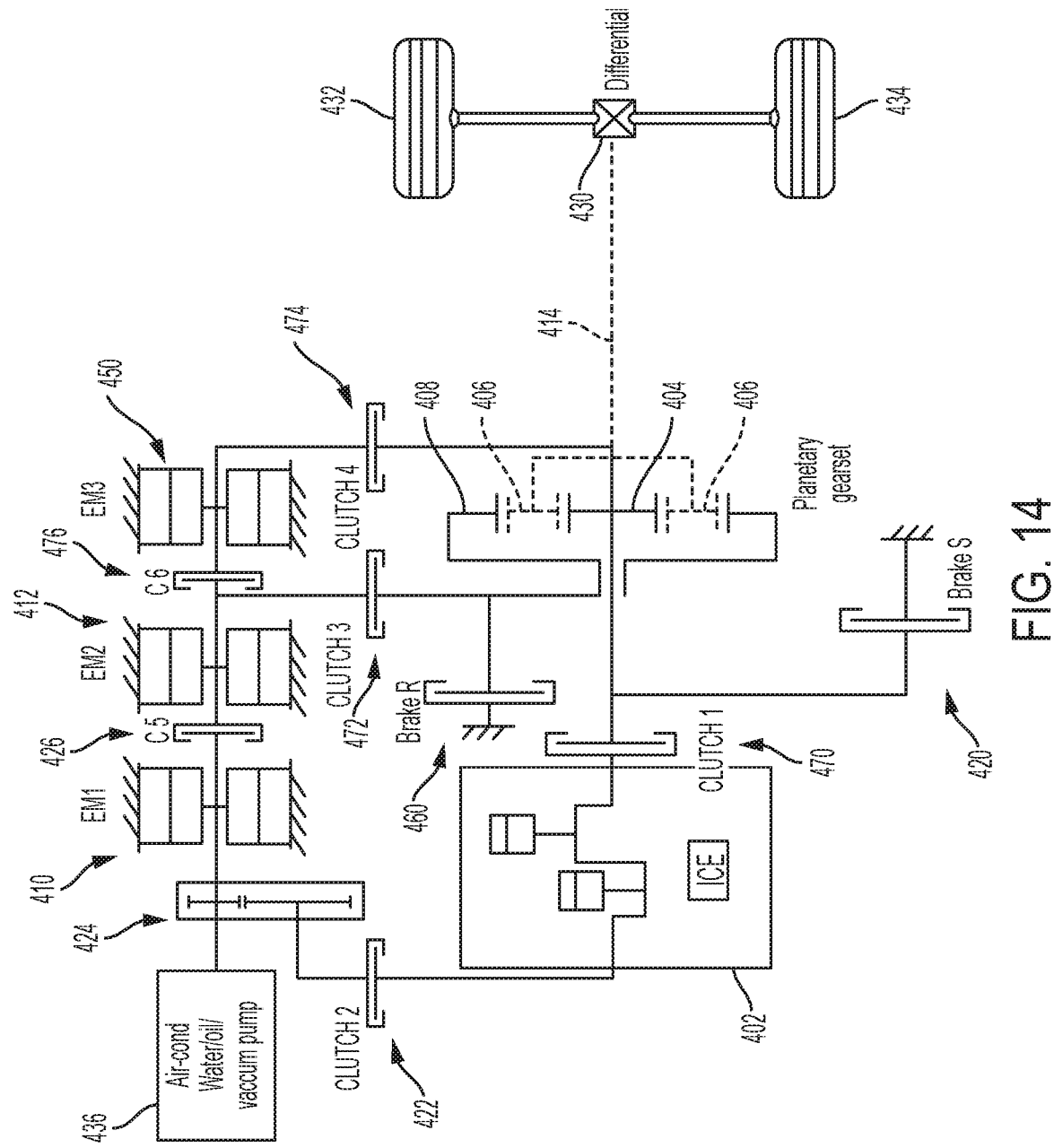
FIG. 14 represents another exemplary connection diagram, where the Motor is connected to a multiplier box through a Clutch (Clutch 2) and the Sun of a planetary gear system through a Clutch (Clutch 1). The multiplier box is connected to an Electric Machine (EM 1), which is connected through another Clutch (C 5) with a second Electric Machine (EM 2), which is connected through another Clutch (C 6) to another Electric Machine (EM 3). The Sun is connected to the Clutch of the Motor (Clutch 1) and to a Brake (Brake S). The Carrier is connected to the final transmission shaft and through a Clutch (Clutch 4) to an Electric Machine (EM 3). The Ring is connected to a Brake (Brake R) and through a Clutch (Clutch 3) to an Electric Machine (EM2).

FIG. 14 represents another exemplary connection diagram, where the ICE 402 is connected to a multiplier box 424 through a Clutch 422 (Clutch 2) and the central gear 404 of a planetary gear system 404, 406, 408 through a Clutch 470 (Clutch 1). The multiplier box 424 is connected to an Electric Machine (EM 1) 410, which is connected through another Clutch 426 (C5) with a second Electric Machine (EM 2) 412, which is connected through another Clutch 476 (C 6) to another Electric Machine (EM 3) 450. The central gear 404 is connected to the Clutch 470 of the Motor (Clutch 1) and to a Brake 420 (Brake S). The Carrier 406 is connected to the final transmission shaft 414 and through a Clutch 474 (Clutch 4) to an Electric Machine (EM 3) 450. The Ring 408 is connected to a Brake 460 (Brake R) and through a Clutch 472 (Clutch 3) to an Electric Machine (EM2) 412.

In a configuration similar to the one described in FIG. 14, if electric-only operation is required, the sun brake 420 (brake s) is activated, leaving the clutches 422, 472 disconnected (clutch 3 and/or clutch 2) and selectively coupling the clutches 426, 476 (c 5 and c 6) so that the final transmission shaft 414 (or final reduction shaft) can be moved with the electric machines 410, 412, 450 (EM 3 and/or EM 2 and/or EM 1).

Mode of Regeneration in Coasting and/or Braking.

In a configuration similar to that described in FIG. 12, the Sun Brake 220 is activated, and the clutch 222 is disengaged between Motor 202 and EM1 210 and the clutch 226 is engaged between EM1 210 and EM2 212. If a clutch is placed between the engine and the Sun (as in FIG. 4), the engine 202 can remain on, otherwise it will be switched off each time the Sun Brake 220 is activated; passing the final shaft of transmission 214 to move the Carrier 206 and move EM1 210 and EM2 212, generating energy that can be accumulated. If, to the contrary, EM1 210 and EM2 212 do not couple together, energy recovery in braking is only be performed in EM2 212.

In the case of a configuration similar to that described in FIG. 14: Sun Brake 420 activated, clutch 3 472 uncoupled, in decelerations and/or braking, energy can be recovered through EM3 450, and/or EM2 412, and/or EM1 410.

Extra Power Mode.

In the, for example, two EM mode, providing the system with a clutch between the EM2 212 and the Ring Brake 228 makes it possible to generate an intense acceleration. By applying the Brake R 228, activating the clutch (similar to clutch 472 in FIG. 4) between Ring 208 and EM2 212, and coupling EM1 210 and EM2 212, both electric motors will assist the Motor 202 when starting out from a stopped position.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

The invention claimed is:

1. A drive mechanism for hybrid or mild hybrid motorization, the drive mechanism comprising:
   a planetary gear system comprising a sun gear, a ring gear, one or more satellite gears, and a carrier connected to the one or more satellite gears, wherein the carrier further connects the drive mechanism to a final transmission shaft;
   a first energy source; and
   a second energy source,
   wherein the sun gear is connected to a first brake,
   wherein the ring gear is connected to a second brake,
   wherein the first energy source comprises an electric machine that is connected to the ring gear through a first clutch, a first gear connection, and a second clutch such that rotational movement is supplied by the electric machine to the ring gear through at least one of the first clutch, the first gear connection, and the second clutch,
   wherein the second energy source is connected to the sun gear through a third clutch, and
   wherein the second energy source is connected to the ring gear through a fourth clutch.

2. The drive mechanism of claim 1, wherein the second energy source is an internal combustion engine.

3. The drive mechanism of claim 1, wherein the drive mechanism is configured to operate in a braking mode when deceleration of the final transmission shaft is required, wherein, in the braking mode, the first brake is engaged such that rotational energy from the final transmission shaft is transferred to the ring gear.

4. The drive mechanism of claim 1, wherein the drive mechanism is configured to operate in an electric mode wherein the third clutch is disengaged and the first brake is engaged such that the rotational movement is provided solely by the electrical machine.

5. The drive mechanism of claim 1, wherein the drive mechanism is configured to operate in a main only mode wherein (i) the first clutch and the second clutch are disengaged, and (ii) the second brake is engaged such that the rotational movement is provided solely by the second energy source.

6. The drive mechanism of claim 1, wherein the electric machine is connected to the second energy source through a second gear connection and a fifth clutch.

7. The drive mechanism of claim 6, wherein the drive mechanism is configured to operate in a charging mode when the final transmission shaft is not rotating, wherein, in the charging mode, (i) the first clutch, the second clutch, the third clutch, and the fourth clutch are all disengaged, and (ii) the fifth clutch is engaged such that the second energy source provides a second rotational movement to the electric machine.

8. The drive mechanism of claim 7, wherein the electric machine comprises two electric motors connected to each other through a sixth clutch, wherein the drive mechanism is configured to operate such that one of the two electric motors transforms electrical energy into rotational energy and wherein the other of the two electric motors is arranged to transform rotational energy into electrical energy.

9. The drive mechanism of claim 7, further comprising a control unit configured to control at least one of the first through fifth clutches, the first brake, and the second brake.

10. The drive mechanism of claim 9, wherein the control unit is further configured to control rotation of the final transmission shaft.

11. The drive mechanism of claim 9, wherein the control unit is further configured to control at least one of the rotational movement and the second rotational movement.

* * * * *